(12) United States Patent
Warsowe

(10) Patent No.: US 11,513,025 B1
(45) Date of Patent: Nov. 29, 2022

(54) LEAK DETECTION SYSTEMS

(71) Applicant: Marc Warsowe, Redwood City, CA (US)

(72) Inventor: Marc Warsowe, Redwood City, CA (US)

( * ) Notice: Subject to any disclaimer, the term of this patent is extended or adjusted under 35 U.S.C. 154(b) by 0 days.

(21) Appl. No.: 17/188,557

(22) Filed: Mar. 1, 2021

Related U.S. Application Data

(63) Continuation-in-part of application No. 16/361,133, filed on Mar. 21, 2019, now Pat. No. 10,934,695.

(60) Provisional application No. 62/646,057, filed on Mar. 21, 2018.

(51) Int. Cl.
| | |
|---|---|
| *G01M 3/28* | (2006.01) |
| *G01F 1/075* | (2006.01) |
| *E03B 7/00* | (2006.01) |
| *G01F 1/38* | (2006.01) |

(52) U.S. Cl.
CPC .......... *G01M 3/2807* (2013.01); *E03B 7/003* (2013.01); *G01F 1/075* (2013.01); *G01F 1/38* (2013.01)

(58) Field of Classification Search
CPC ...... G01M 3/2807; E03B 7/003; G01F 1/075; G01F 1/38
USPC .................. 137/487.5, 513.3, 513.7, 115.03; 73/861.352, 861.353, 861.77, 861.79, 274
See application file for complete search history.

(56) References Cited

U.S. PATENT DOCUMENTS

| | | | | |
|---|---|---|---|---|
| 956,860 | A ‡ | 5/1910 | Lawler .................... | E03C 1/057 137/607 |
| 975,662 | A ‡ | 11/1910 | Watrous .................. | E03C 1/242 4/672 |
| 979,532 | A ‡ | 12/1910 | Merrill et al. .......... | F16K 11/16 137/865 |
| 1,047,067 | A ‡ | 12/1912 | Jones ....................... | E03B 9/16 137/299 |
| 1,303,939 | A ‡ | 5/1919 | Moellmer ................ | G10K 5/00 116/138 |
| 1,572,394 | A ‡ | 2/1926 | Krebs ..................... | E21B 33/04 166/86.2 |
| 1,800,314 | A ‡ | 4/1931 | Noftzger ................. | F16K 17/00 137/410 |
| 2,038,943 | A ‡ | 4/1936 | La Fountain ........... | F16K 11/18 137/636.3 |
| 2,149,367 | A ‡ | 3/1939 | Seldon .................... | F16K 11/18 137/635 |

(Continued)

*Primary Examiner* — Minh Q Le
(74) *Attorney, Agent, or Firm* — Steven A. Nielsen; www.NielsenPatents.com

(57) ABSTRACT

A leak detection system for plumbing fixtures may include a dual channel system (700) having two channels of water flow to measure fluid flow that is both intentional and accidental. A disclosed embodiment may include a body (710) that is sometimes fastened to a top plate (715) sometimes fastened with socket head cap screws (717). The dual fluid channels may comprise a lower default or first flow path (790). Water flowing though the lower or default path may pass through a paddle wheel assembly (760) and paddle wheel (762) wherein flow rate may be measured by a myriad of systems including magnets or other sensors deposed on the distal ends of the paddle wheel spokes. A leak detection system may also include a single channel system (800) with a flap system. Disclosed systems may include other types of leak measuring devices.

4 Claims, 25 Drawing Sheets

(56) References Cited

U.S. PATENT DOCUMENTS

| | | | | |
|---|---|---|---|---|
| 2,453,809 | A ‡ | 11/1948 | Newcomer | F16K 11/20 137/555 |
| 2,464,458 | A ‡ | 3/1949 | Newcomer | F16K 11/165 137/555 |
| 2,723,563 | A * | 11/1955 | Stevenson | G01F 1/10 73/861.89 |
| 3,499,465 | A ‡ | 3/1970 | Roop | A01J 5/10 137/624.13 |
| 4,523,479 | A * | 6/1985 | Johnson | G01F 1/80 73/861.351 |
| 4,589,435 | A * | 5/1986 | Aldrich | F16K 21/16 137/625.22 |
| 4,727,901 | A ‡ | 3/1988 | Horvei | F16K 27/067 137/315.18 |
| 4,749,004 | A ‡ | 6/1988 | Peash | B64D 13/00 137/865 |
| 4,911,200 | A * | 3/1990 | Ben-Arie | G01M 3/2807 137/486 |
| 4,949,753 | A ‡ | 8/1990 | Stewart | F16K 11/16 137/605 |
| 5,038,820 | A * | 8/1991 | Ames | F16K 31/02 137/460 |
| 5,199,119 | A ‡ | 4/1993 | Weber | E03C 1/052 251/295 |
| 5,251,149 | A * | 10/1993 | Williams | G01F 3/12 73/1.28 |
| 5,462,086 | A ‡ | 10/1995 | Taylor | F16K 11/16 137/865 |
| 5,507,469 | A ‡ | 4/1996 | Soderberg | F16K 5/0647 251/248 |
| 5,721,383 | A * | 2/1998 | Franklin | G01F 1/46 73/861.79 |
| 5,730,507 | A ‡ | 3/1998 | MacWilliam | B60R 25/08 137/354 |
| 5,767,419 | A * | 6/1998 | Hutchinson | G01F 1/24 73/861.74 |
| 5,950,667 | A * | 9/1999 | Nicewonger | B23K 11/36 251/9 |
| 6,487,919 | B1 * | 12/2002 | Edwards | G01F 1/12 73/861.77 |
| 7,921,726 | B2 * | 4/2011 | Ellegood | G01P 5/04 73/740 |
| 8,082,947 | B2 ‡ | 12/2011 | Chang | F16K 27/067 137/614.01 |
| 8,505,376 | B2 * | 8/2013 | Ross | G01F 1/74 73/152.29 |
| 8,684,033 | B2 ‡ | 4/2014 | Albert | F02B 29/0418 137/601.11 |
| 8,720,481 | B2 * | 5/2014 | Guy | F17D 5/02 137/625.14 |
| 9,938,698 | B2 * | 4/2018 | Guy | G01M 3/2807 |
| 10,229,579 | B2 * | 3/2019 | Alcorn | G01F 15/0755 |
| 10,527,516 | B2 * | 1/2020 | Banerjee | G01M 3/007 |
| 10,768,030 | B1 * | 9/2020 | Chang | G01F 1/075 |
| 11,053,668 | B1 * | 7/2021 | Manning | E03B 7/075 |
| 11,118,953 | B2 * | 9/2021 | Croteau | G01F 1/075 |
| 2003/0000575 | A1 * | 1/2003 | Allen | G05D 11/006 137/118.04 |
| 2003/0066340 | A1 * | 4/2003 | Hassenflug | G01F 1/28 73/46 |
| 2005/0204829 | A1 * | 9/2005 | Cohen | G01F 15/005 73/861.53 |
| 2008/0251147 | A1 ‡ | 10/2008 | Hara | F16K 11/165 137/637 |
| 2009/0049927 | A1 * | 2/2009 | Spivak | G01F 1/78 73/861.352 |
| 2009/0150096 | A1 * | 6/2009 | Brown | G01F 1/075 702/45 |
| 2009/0194719 | A1 * | 8/2009 | Mulligan | F16K 15/026 251/129.01 |
| 2009/0277280 | A1 * | 11/2009 | Tanaka | G01F 1/075 73/861.77 |
| 2011/0062359 | A1 ‡ | 3/2011 | Zelikovich | E03C 1/052 251/129.04 |
| 2013/0036796 | A1 * | 2/2013 | Fleury, Jr. | H01Q 1/38 73/40.5 R |
| 2014/0131604 | A1 ‡ | 5/2014 | Walker | F16K 31/62 251/213 |
| 2014/0165719 | A1 * | 6/2014 | Williamson | G01F 1/06 73/272 R |
| 2015/0316936 | A1 * | 11/2015 | Mccarrick | G01F 1/56 700/282 |
| 2015/0361644 | A1 * | 12/2015 | Warsowe | F16K 27/0263 137/603 |
| 2016/0377464 | A1 * | 12/2016 | Adlon | G01F 1/075 73/861.08 |
| 2017/0278372 | A1 * | 9/2017 | Doughty | G01F 1/28 |
| 2018/0230681 | A1 * | 8/2018 | Poojary | E03B 7/072 |
| 2018/0347157 | A1 * | 12/2018 | Brotherton | E03B 7/072 |
| 2020/0354929 | A1 * | 11/2020 | Tasser | E03B 7/072 |
| 2021/0333135 | A1 * | 10/2021 | Geerligs | G01F 15/063 |

\* cited by examiner
‡ imported from a related application

Foot Pedal Board Components

LEAK DETECTION SYSTEMS

CROSS-REFERENCE TO RELATED APPLICATIONS

This patent application claims the benefit and priority date of and is a continuation in part (CIP) of U.S. patent application Ser. No. 16/361,133 filed on Mar. 21, 2019 which claims the priority date of provisional patent application 62/646,057 filed on Mar. 21, 2018, the contents of which are incorporated herein by reference as if restated herein.

COPYRIGHT AND TRADEMARK NOTICE

This application includes material which is subject or may be subject to copyright and/or trademark protection. The copyright and trademark owner(s) has no objection to the facsimile reproduction by any of the patent disclosures, as it appears in the Patent and Trademark Office files or records, but otherwise reserves all copyright and trademark rights whatsoever.

BACKGROUND OF THE INVENTION

AquaPedal System

Field of the Invention

The invention generally relates to domestic water control and reporting systems. More particularly, the invention relates to means and methods of creating and using various hands-free water controls and database systems to collect, report and analyze user water usage data.

Fluid Motion-Measurement And Micro Leak Detection System

Field of the Invention

The invention generally relates to means and methods of detecting and reporting very small leaks in the water valves of toilets and other indoor and outdoor water outlets that are below the minimum flow rate (gpm)/sensitivity of traditional flow meters/leak sensors, or, most commonly with respect to toilets, if sufficiently sensitive to detect very small leaks, then are so physically intrusive inside the water pipe that refills a toilet tank after flushing that these devices prevent the toilet tank from being filled at its manufacturer-specified rate (gpm), or at the fill-rate (gpm) specified by a building's architect or mechanical engineer. More particularly, the system relates to the use of a spring loaded or other bypass/diversion system situated in the primary water pipe ahead of a small-diameter by-pass pipe (to which water is diverted as described below) parallel to the larger-diameter primary water pipe. When a toilet is flushed, the resistance of the spring in the by-pass/diversion valve is overcome by the water pressure in the primary water pipe, and the by-pass/diversion valve opens fully, permitting the full volume of water in the primary water pipe to refill the toilet tank or a tank, drum (in the case of a washing machine or dishwasher, or other appliance or device attached to any indoor or outdoor water outlet) at maximum volume. The spring loaded bypass/diversion valve opens at high flow rates (gpm), in the larger-diameter primary water pipe, thus enabling the inlet water supply to refill a toilet tank or other appliance, plumbing fixture, or device using the primary water pipe after a flush without interference by a sensitive flowmeter (a small pinwheel or other fluid-motion sensing device) located inside a by-pass water pipe that, if located in the primary water pipe, would significantly impede the water flow in the primary water pipe from refilling the toilet tank or other appliance, plumbing fixture, or other device. After a toilet tank, washing machine, dishwasher, or other plumbing fixture, devise or appliance has filled, or before the appliance is used, water in the primary pipe should not be flowing to any degree, and if it does, then there is a leak in the toilet tank gaskets or valves, or in the inlet gaskets or valves on a washing machine, dishwasher or other device. intended to monitor, measure, record, store, and transmit data about minor leaks that are located either in the inlet water pipe downstream from the flowmeter, or in the toilet itself. After a flush, the spring-loaded by-pass/diversion valve returns to its default closed position and is seated firmly in the primary water pipe, so that any amount of water flow is diverted into the by-pass pipe with its highly sensitive flow meter, either a small pinwheel flow meter or other fluid-motion sensing technology or device, which is used to detect system water leaks once the toilet tank has been refilled.

In an alternative embodiment, a sensing device capable of precisely measuring and recording fluid flow rates is disclosed and described herein. The value system may measure and record fluid motion by use of a paddle wheel within a small-diameter by-pass pipe of a two-chamber water inlet pipe.

In an alternative embodiment, a triangle valve system is disclosed and described herein. The triangle value system may detect leaks by use within a sole water inlet pipe.

In an alternative embodiment, a sensing device capable of precisely measuring and recording fluid flow rates is disclosed and described herein. The triangle value system or other systems described herein may measure and record fluid motion by use of a rotational sensing device attached to instruments such has electronic instruments disposed within a cavity containing fluid.

Shower Stall Heater/Blower and Vent

Field of the Invention

The embodiment generally relates to means and methods of saving energy-rich hot water during showers. More particularly, the embodiment relates to providing ambient heat produced by the hot water to a user in an enclosed or open showering space, to keep the user warm without using hot water to stay warm. The embodiment also permits hotels to offer their guests an in-shower steam bath/moist sauna as an amenity.

Passive System to Reduce or Eliminate Mineral Rings in Toilet Bowls

Description

Tap water used in toilets often contains minerals that, when exposed to air in toilet bowls, are precipitated out, creating insoluble "rings" that are unsightly and frequently difficult to remove.

Cathode and anode electrodes are placed inside any conventional gravity-powered toilet tank or any other such tank, through which a very low voltage current runs. The electrodes could be powered by a small battery, or by the natural galvanic coupling of dissimilar metals or other electrolytic materials. The water, as is or with enhanced electrolytic capacity, serves as the electrolyte.

Dissolved minerals in the water tank will be drawn towards the appropriate electrode and will be precipitated out on the electrode or onto the floor of the toilet tank, thereby reducing or eliminating the formation of mineral build-up in the toilet bowl between flushes.

Alternatively, one or both electrodes could be composed of a substance, appropriate for the minerals in the local water supply that would combine with the mineral ions in the toilet tank water, precipitating out an insoluble compound in the tank, rather than at the edge of the water in the toilet bowl.

AquaPedal System

The embodiment overcomes shortfalls in the related art by using several possible mechanical and electrical systems to avoid the use of hands in controlling water flow rate Gallons Per Minute (gpm) and duration at faucets after the user sets the initial maximum water flow (and temperature). In one disclosed embodiment, water flow rate (gpm) and duration is controlled for a bathroom vanity by a foot pedal, with the foot pedal exchanging information with a base unit having means of controlling the water flow rate (gpm) and duration of water delivered to the user after the user sets the initial water flow and temperature using the faucets.

Disclosed systems also include a base unit with onboard electronics to assist in the mechanical control of water flow and to report, wirelessly or wired, water usage to a local LED display and in a disclosed embodiment, to a remote system server. A future version may remote system server or cloud-based database system may include software for the gamification of stored and analyzed system water- and energy-use information.

Disclosed systems also include a plurality of user input systems to control water flow rate (gpm) and duration with such input systems including foot pedals, foot paddles, hip plates, buttons, touchless sensors, voice command and other user control systems.

Disclosed systems also include flowmeter and temperature sensor units. These sensor units in a disclosed embodiment are injection-molded cartridges (similar to the coupling adapters) with a flowmeter for cold water), or a combined flowmeter and temperature sensor (for hot water) located inside their respective cartridges. Sensor units can be attached to the hot or cold inlets of the manifold by means of the same system permitting different coupling adapters to be attached to the manifold. The sensor units' coupling system will enable water hoses carrying hot or cold water to the device to connect to the cartridges by means of the same coupling adapter system, which would be installed interposed between the water source and the device's manifold. In addition, sensor units will contain wireless devices that will transmit in real-time the sensors' data signals to the firmware inside the manifold housing.

Disclosed systems also include a potentiometer or other device in the pedal or other actuator that will send variable signals to the microcontroller and motor located in the base unit that will enable the motor atop the manifold to open and close the ceramic disk water valves to different degrees of openness and at variable tempos.

Disclosed systems also maintain water valves in a closed position by default when the user is not actuating the actuator.

Disclosed systems also include a mechanical or electronic device located in the actuator that signals the microcontroller and motor to open the water valves fully, or to maintain the then-existing degree of openness, until a subsequent signal from the actuator signals the microcontroller and motor to resume normal function, thus enabling a user to continue to run water hands-free, but without maintaining contact with the actuator.

Disclosed systems also include a manual on/off lever connected to the gears and valves that the user can use to mechanically open or close the valves, in the event that the electrical, electronic, and other mechanical parts of the device fail, leaving the valve partially or fully open or closed.

These and other objects and advantages will be made apparent when considering the following detailed specification when taken in conjunction with the drawings.

Brief Summary of the Invention

Fluid Motion-Measurement And Micro Leak Detection System

The detection of micro water leaks in toilet systems is a difficult problem that has never yet been successfully solved. To the naked eye, small amounts of water draining out of a toilet, or flowing into a washing machine, dishwasher or other plumbing fixture (such as a shower or hot tub) or device are not apparent and may not be suspected even after receipt of a water bill. In the related art, the use of pinwheel flow meters are known, but are not used in toilet leak detection since most pinwheel flow meters are either not sensitive enough to detect micro water leaks, or require many paddles, which, taken together, greatly restrict the flow of water to fill a toilet after flushing, or a washing machine at the outset of its wash or rinse cycles, because they are generally bulky, restricting both the volume and velocity of the water passing through them. To overcome this shortfall in the art, disclosed embodiment use a two-pipe by-pass/diversion system. One pipe, the larger diameter one, is an unobstructed pipe that permits the relatively large plug of water needed to quickly refill a toilet after flushing or to fill a washing machine or dishwasher. A spring-loaded by-pass/diversion valve permits the water pressure of that plug of water to open the by-pass/diversion valve, thus circumvent a second, much smaller diameter pipe containing a pinwheel or other highly sensitive flowmeter sufficiently sensitive to detect the micro flow of a slow water leak. After a toilet has been refilled, and the water pressure on the by-pass/diversion drops, the by-pass/diversion valve is deactivated, returning to its default closed position, and any water still flowing in the upstream pipe is directed to the smaller diameter pipe containing a highly sensitive, multi-paddle pinwheel or other highly sensitive flowmeter, physically located under or over the unobstructed pipe, to take advantage of gravity. A sufficiently sensitive pinwheel flow meter is very adept at detecting very small movements of water and hence is well suited to detect the slow leaks that are found in many toilets and in residential, commercial, and institutional plumbing systems.

Brief Summary of the Invention

Shower Stall Ambient Air Heater System Using a Bi-Directional Fan, and Temperature-Controlled Exhaust Vent Flapper In the prior art, people often leave shower water running when not needed in order to stay warm. For example, while washing hair, running water is not needed for the entire process and mixed hot and cold water could be turned off during the duration. The presently disclosed embodiments overcome shortfalls in the art by using vents to blow warm air already heated by the hot shower water to a bather to allow the bather to turn off both hot and cold water when not needed.

Brief Summary of the Invention

Dual Channel Fluid Motion-Measurement and Micro Leak Detection System with Spring and Paddle Wheel

A dual channel system 700 features two channels of water flow to artfully measure fluid flow that is both intentional and accidental. A disclosed embodiment may include a body 710 that is sometimes fastened to a top plate 715 sometimes fastened with socket head cap screws 717. The dual fluid channels may comprise a lower default or first flow path 790. Water flowing though the lower or default path may pass through a paddle wheel assembly 760 and paddle wheel 762 wherein flow rate may be measured by a myriad of systems including magnets or other sensors deposed on the distal ends of the paddle wheel spokes. Electronic components may be in communication with the sensors to report the rotations of the paddle wheel spokes which may be used to report flow rate.

In the event of a full flow of fluid entering the system, the upper or secondary channel 800 will open upon sufficient pressure upon a piston assembly 730 with the piston assembly sometimes comprising a piston 732, spring 734 or other resilient member and a piston retainer 740.

The dual channel system overcomes shortfalls in the related art by providing very accurate and precise water flow measurements during relative low flow events. Thus, the paddle wheel may receive and measure and be so geared to receive waterflows that are indicative of water leaks in a plumbing system.

Single Channel Fluid Motion-Measurement and Micro Leak Detection System with Flap Diaphragm

Another artful water leak reporting system 900 includes a single channel system with a flap diaphragm 940 with the flap diaphragm sometimes connected to diaphragm magnet shaft 950 that may be held in place by a diaphragm bracket 945. The rotation of the diaphragm magnet shaft may be used to sense, record and report the flow of water though the system. The distal edge of the flap diaphragm may be initially set or temporarily held in place by an adjacent 960. The system overcomes shortfalls in the related art by use of an efficient and economical single flow channel and a flap that resets automatically by use of the adjacent magnet 960 and by the leveraged rotational force upon the diaphragm magnet shaft that quickly reports the flow of even the smallest amounts of water, with such small amounts of water sometime being considered "micro" and very useful in leak detection wherein typical leak or small or micro in nature.

REFERENCE NUMERALS IN THE DRAWINGS

Figure 1:
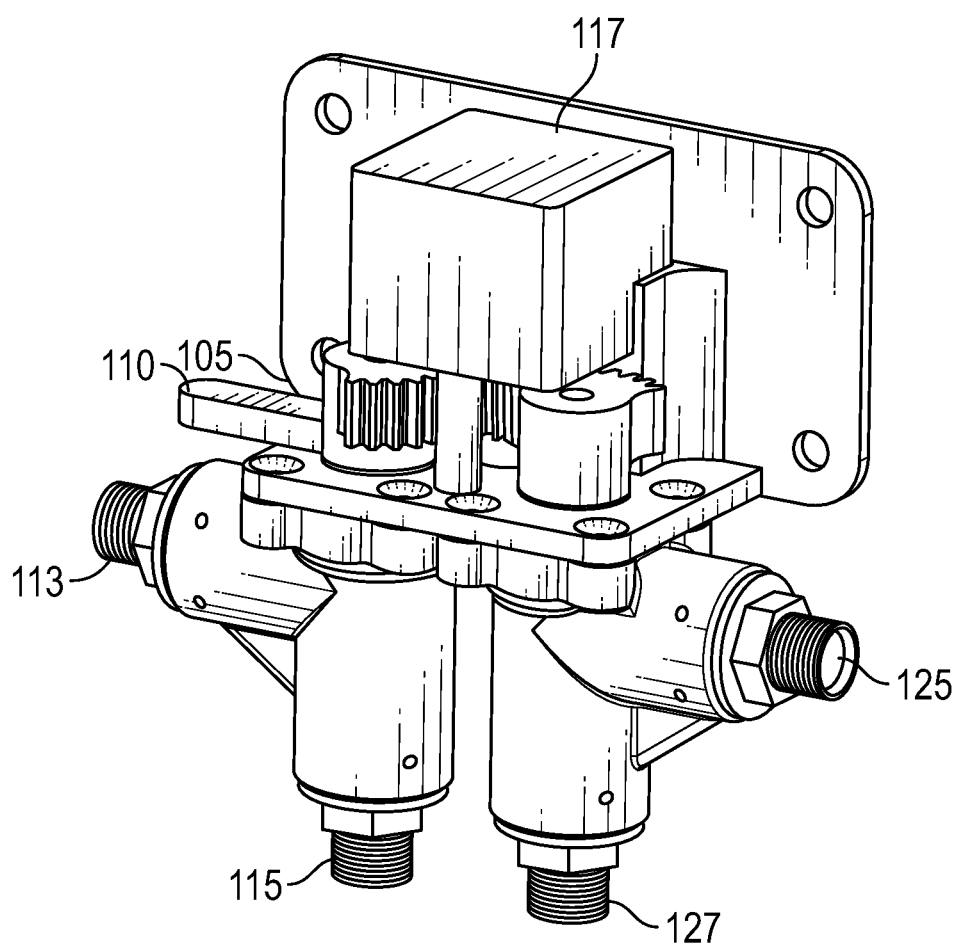
FIG. 1 depicts a perspective view of a main component of an AquaPedal System

100 upper assembly of AquaPedal or water pedal control system in general
104 chassis of upper assembly 100
105 motor home switch location
110 manual on/off lever
111 hot water gear
112 cold water gear
113 hot water outlet
115 hot water inlet
117 stepper motor 118 motor driven gear
119 gateway void of cartridge valve 120
120 cartridge valve
122 stem of cartridge valve 120
125 cold water outlet
127 cold water inlet
130 manifold
135 modular fitting
200 main board
205 dual stepper drive
207 electrical supply
210 voltage regulator
213 wireless bridge, such as Bluetooth
215 RF or radio frequency receiver
217 processor
219 four position DIP switch
220 WiFi receiver and transmitter
222 digital and analog input and output
225 home switch input
230 flowmeter or temperature sensor input 1
235 flowmeter or temperature sensor input 2
300 foot petal board components
303 battery
307 pedal operated micro switch
309 pedal operated variable resistor
311 four position DIP addressing switch
315 foot petal processor
320 foot petal RF or radio frequency transmitter
350 foot pedal housing
355 foot paddle
357 foot actuator arm or rod actuator
360 foot actuator lower plate
363 spring loaded plunger
366 backblock 110
370 foot pedal upper plate
375 potentiometer
390 hip button
395 LCD display
397 flow sensor
398 temperature sensor
400 sink
405 water source
410 home Wi-Fi router
420 internet
430 system database
500 micro leak detection system with multiple chambers
510 water input pipe
520 diversion pipe
530 pinwheel or other sensor disposed with in diversion channel 520
540 high flow sensor
550 spring loaded gate for high flow
560 water exit channel
600 micro leak detection system with single chamber
610 main chamber
615 pipe of main chamber
620 axis of main chamber
630 sensor and Bluetooth of main chamber
635 diaphragm of main chamber
650 water channel to house plumbing
660 water channel to toilet
700 dual channel micro leak detection system with spring and paddle wheel
710 body of dual channel micro leak system
715 top plate of dual channel micro leak system
717 fastener or socket head cap screw of dual channel micro leak system
720 inlet adapter
725 outlet adaptor
730 piston assembly
732 piston of piston assembly 730
734 spring of piston assembly 730
740 piston retainer
750 flexible fastener such as a Torx plastic screw
760 paddle wheel assembly
762 paddle wheel
767 jewel bearing insert
768 linear jewel bearing
770 top O-ring
775 radial jewel bearing
780 direction of water flow
790 default flow path or first flow path of water
800 secondary flow path
810 sensor assembly
820 end caps
900 single channel micro leak detection system with flap diaphragm
905 main void for water flow
910 upper body of single channel micro leak detection system with flap diaphragm
920 lower body of single channel micro leak detection system with flap diaphragm
930 printed circuit board assembly or PCBA
931 magnetic rotational sensor on PCBA
932 PCBA mounted on a daughter card that retains a sensor
935 flexible screw or fastener such as a Torx plastic screw size 2
940 diaphragm or flap
945 diaphragm bracket
950 diaphragm magnet shaft
960 magnet adjacent to distal end of diaphragm

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

AquaPedal System

In general, an actuator system is controlled by an end user and may take any form, including foot pedals, foot paddles, hip plates, buttons, voice command, and electronic sensors. An actuator may be in wired or wireless communication with a motor controller of a base unit. The base unit may accept hot and cold water lines and control the output of the water based upon data received from an actuator system.

Components of disclosed embodiments may include:

A main unit with a main unit comprising an electronic control module or with means of input and output. Upon receiving input from an actuator, a single or dual stepper drive may turn valves located within the main unit. A main unit may include a Nema 17 stepper motor with gear.

Figure 6:
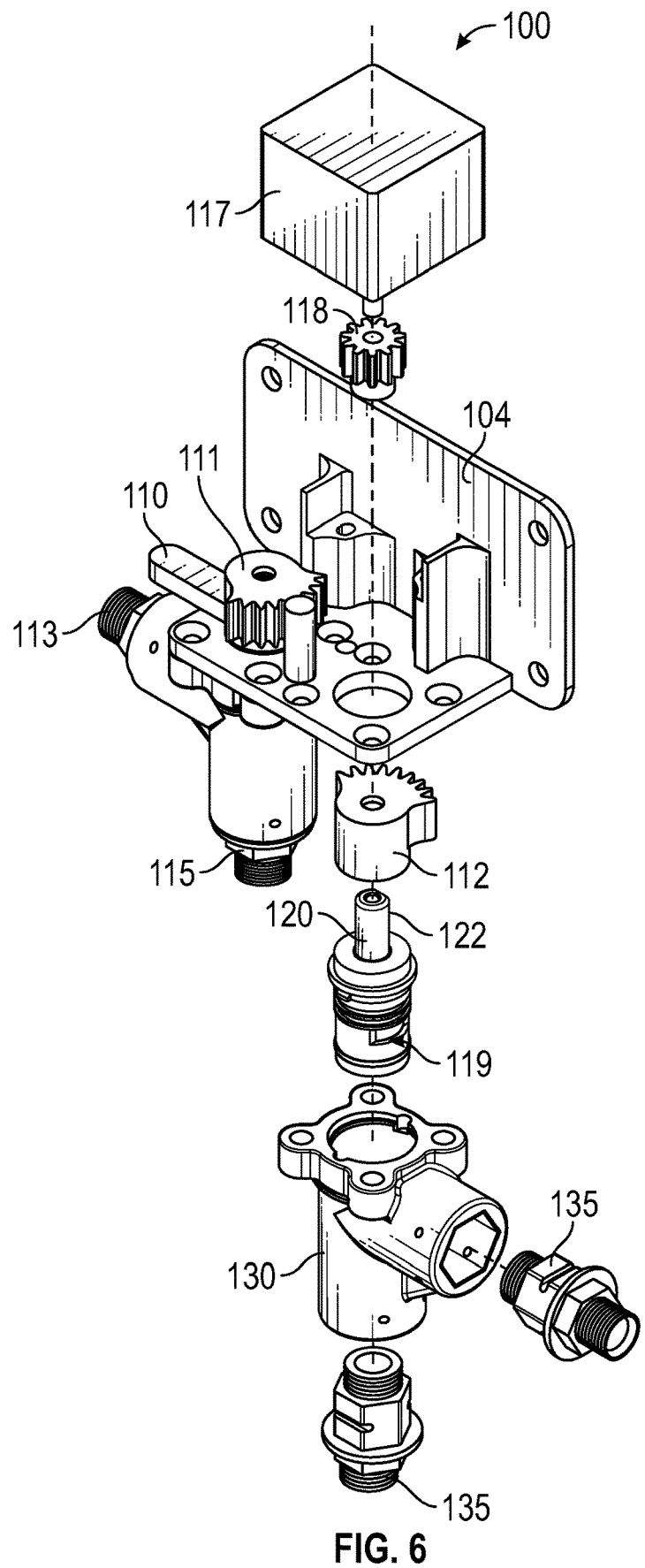
FIG. 6 depicts an exploded view of a main component of an embodiment of an AquaPedal System

Referring to FIG. 1, a main unit may further include a manual on/off lever 110, cold water inlet 127, hot water inlet 115, hot water outlet 113, cold water outlet 125, home motor switch location 105 and switch, and cartridge valves 120 shown in FIG. 6.

Figure 2:
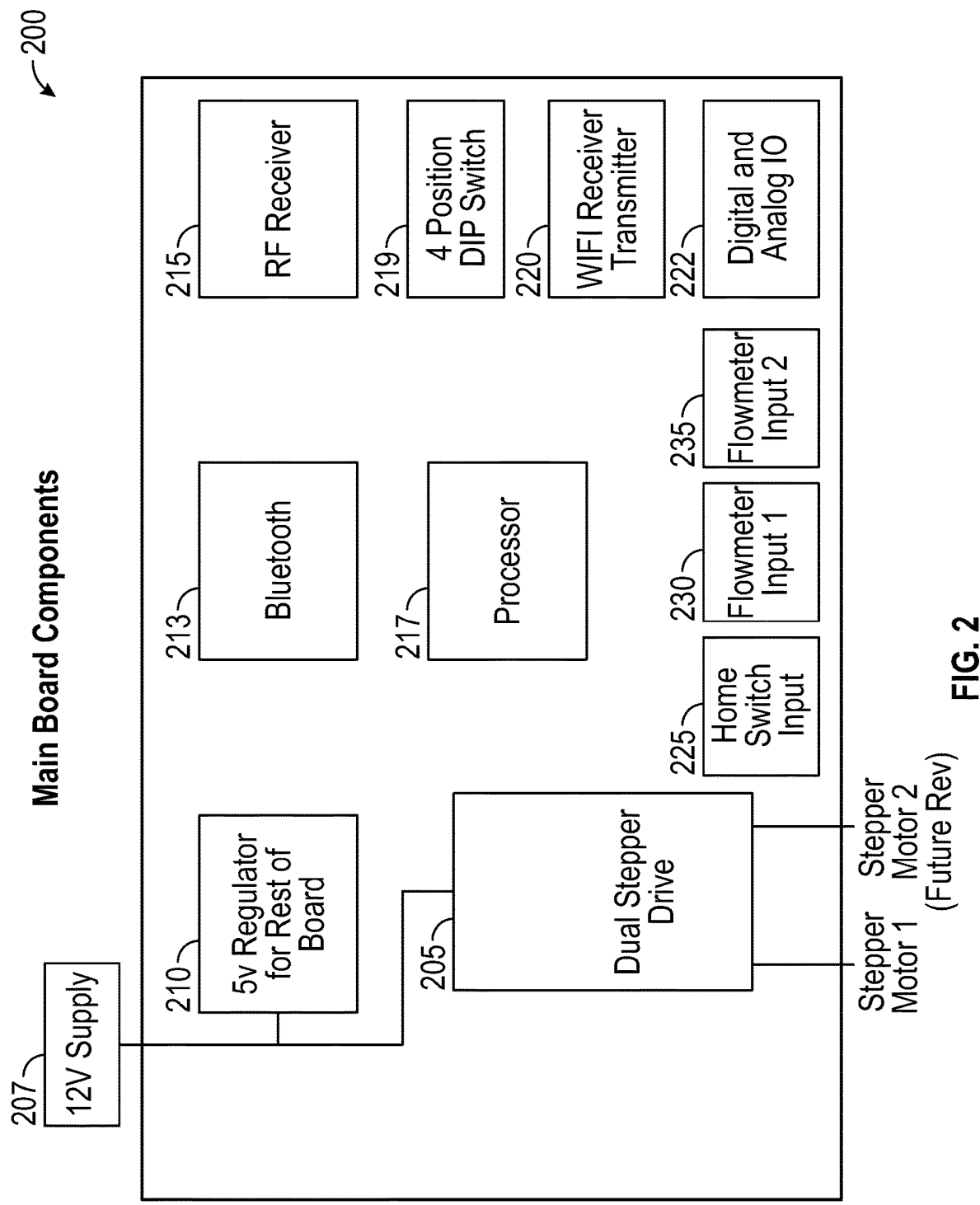
FIG. 2 depicts a main circuit board of an AquaPedal System with components or subsystems

FIG. 2 depicts main electronic board components which may include a power supply 207, a voltage regulator 210, a single or dual stepper drive 205, a wireless communication portal 213 such as Bluetooth, a receiver 215 for radio wave or other wireless communication, a processor 217, a multi position DIP (Dual Inline Package) switch 219, a home switch input 225 and a first 230 and second 235 flowmeter input.

Figure 3:
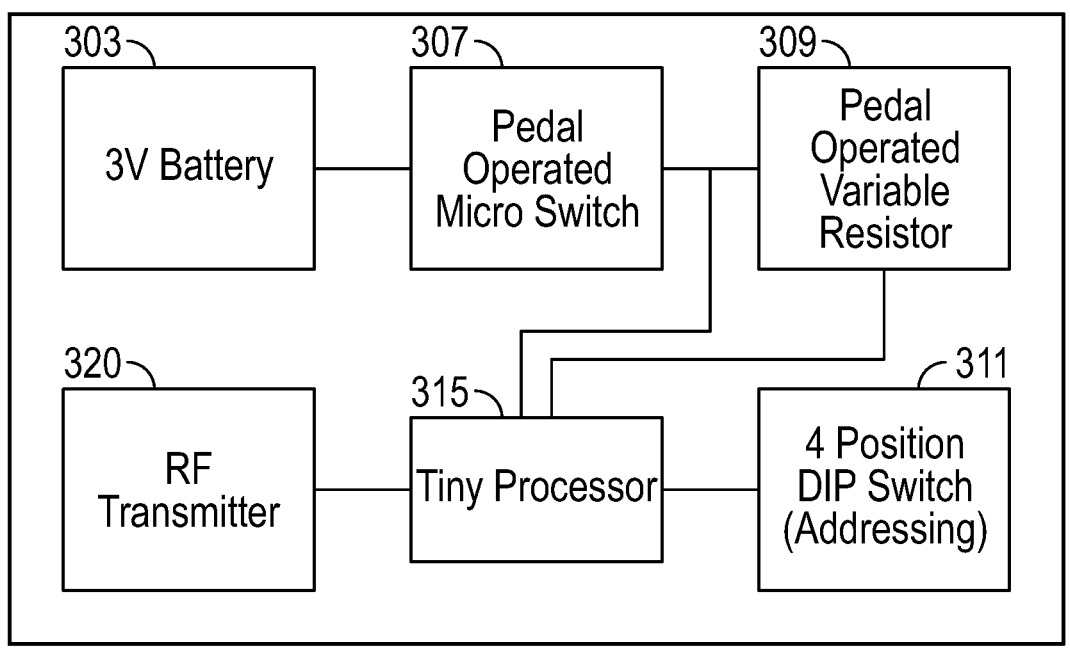
FIG. 3 depicts foot pedal circuit board components of an AquaPedal System
Figure 4A:
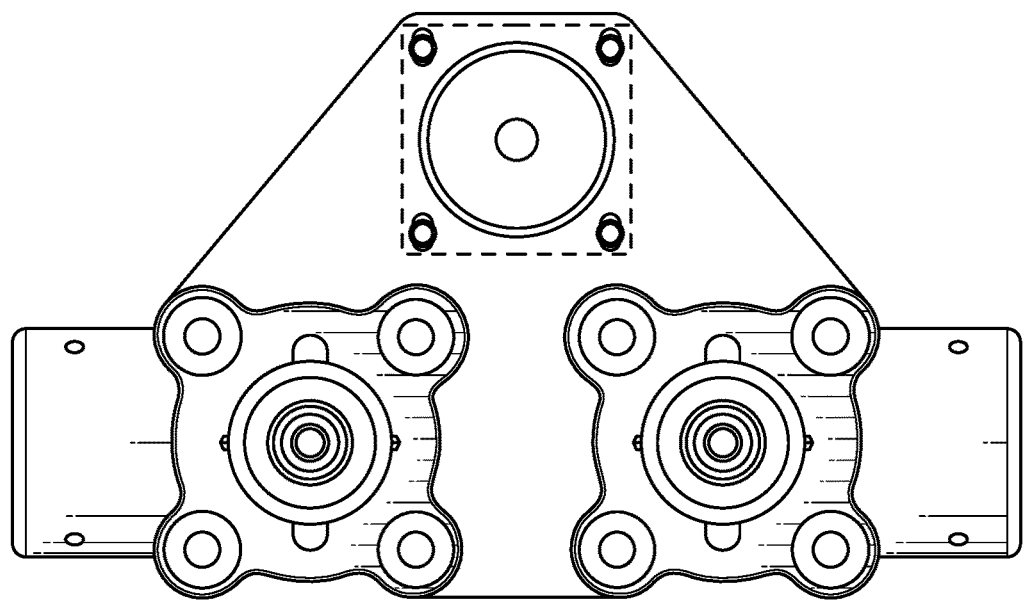
FIG. 4A depicts a top view of an embodiment of a main component of an AquaPedal System
Figure 4B:
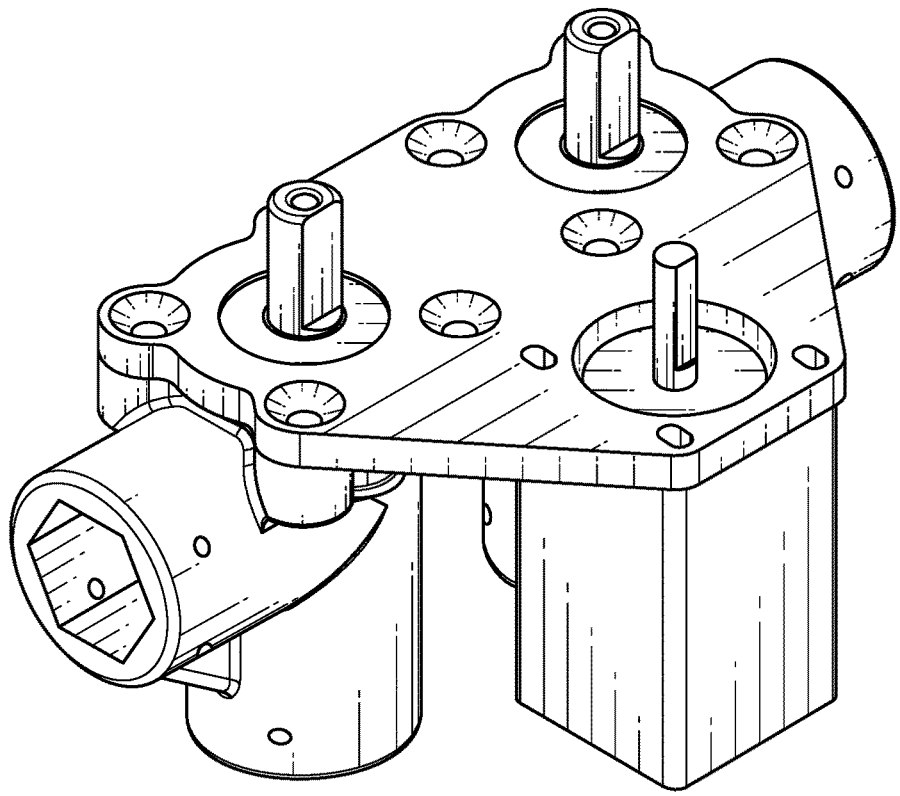
FIG. 4B depicts a perspective view of an embodiment of a main component of an AquaPedal System
Figure 4C:
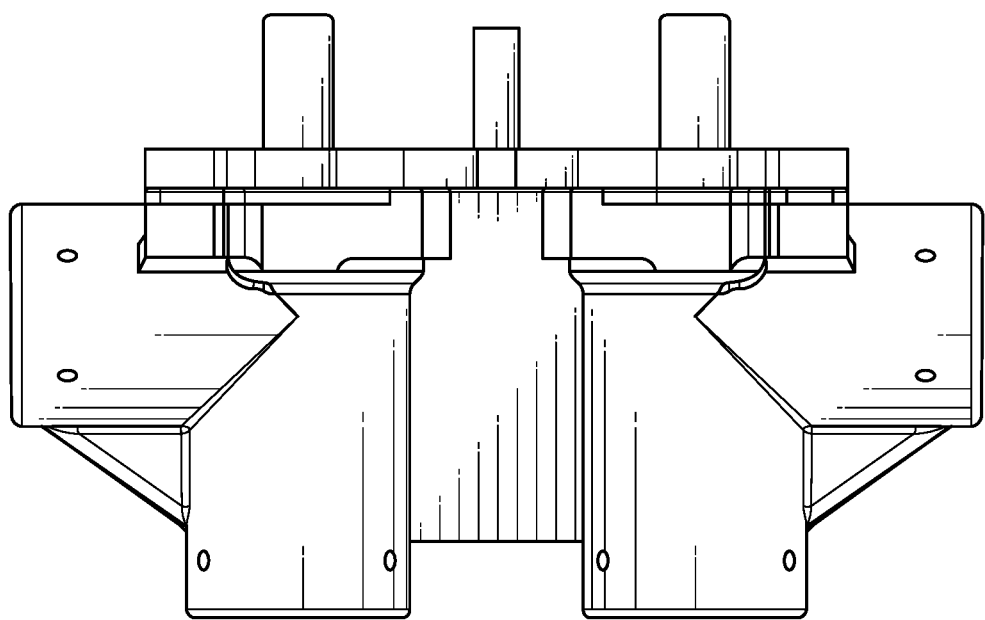
FIG. 4C depicts a side view of an embodiment of a main component of an AquaPedal System
Figure 4D:
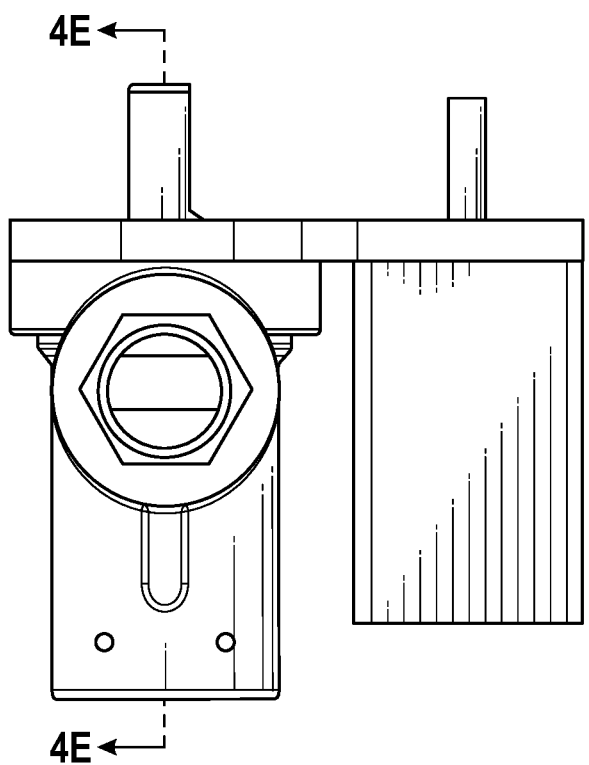
FIG. 4D depicts a side view of an embodiment of a main component of an AquaPedal System
Figure 4E:
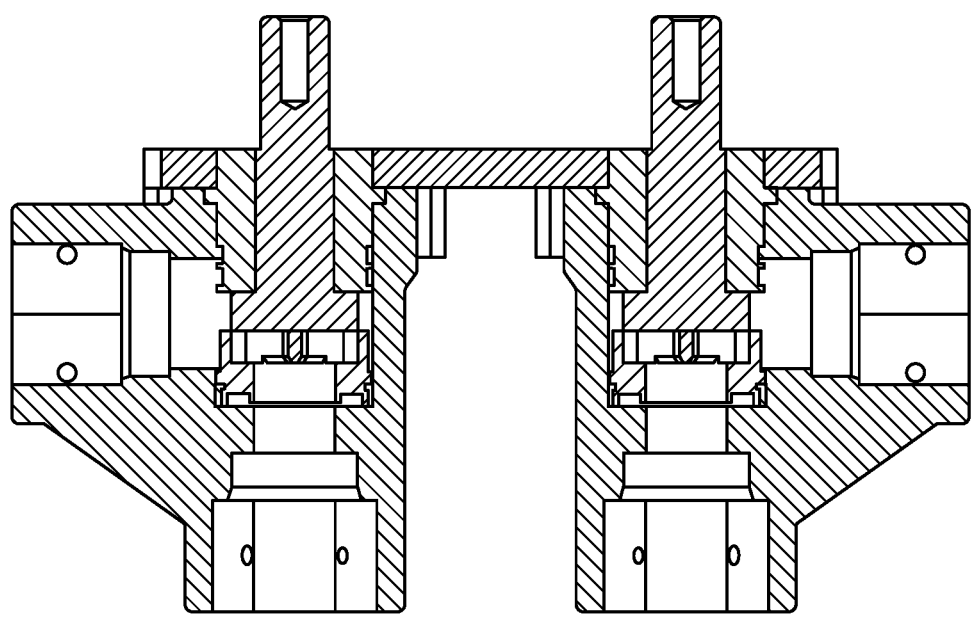
FIG. 4E depicts a sectional view of an embodiment of a main component of an AquaPedal System
Figure 5A:
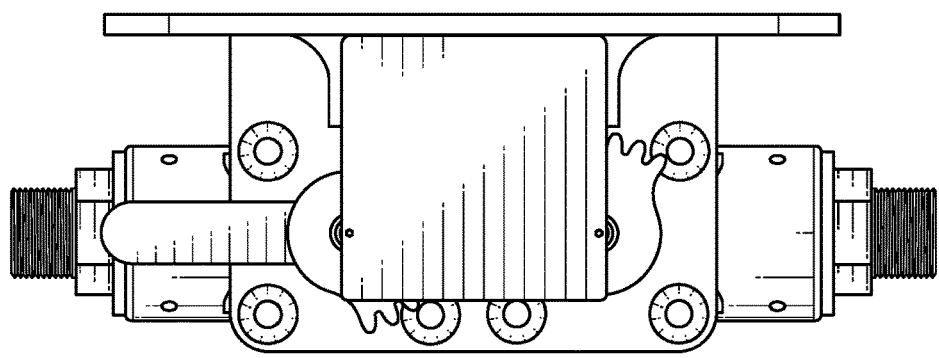
FIG. 5A depicts a top view of an embodiment of a main component of an AquaPedal System
Figure 5B:
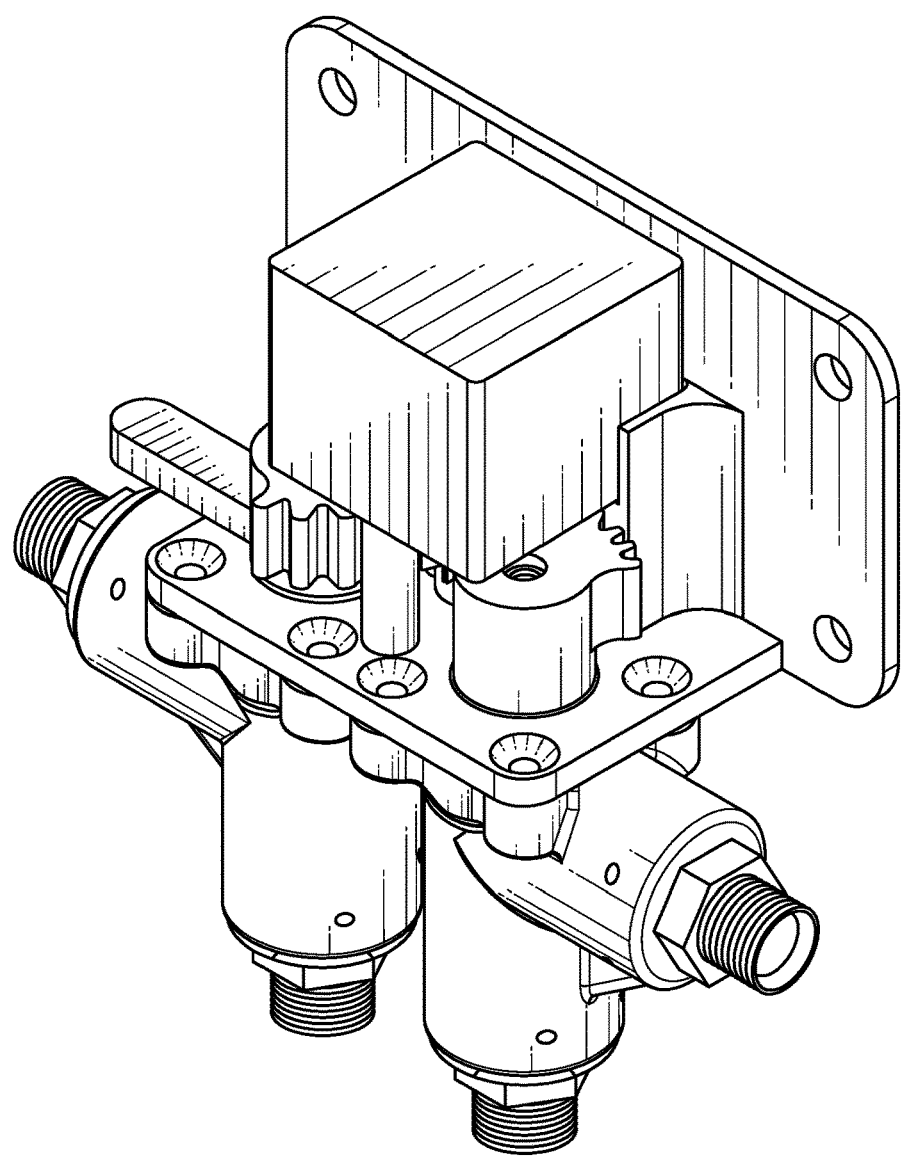
FIG. 5B depicts a perspective view of an embodiment of a main component of an AquaPedal System
Figure 5C:
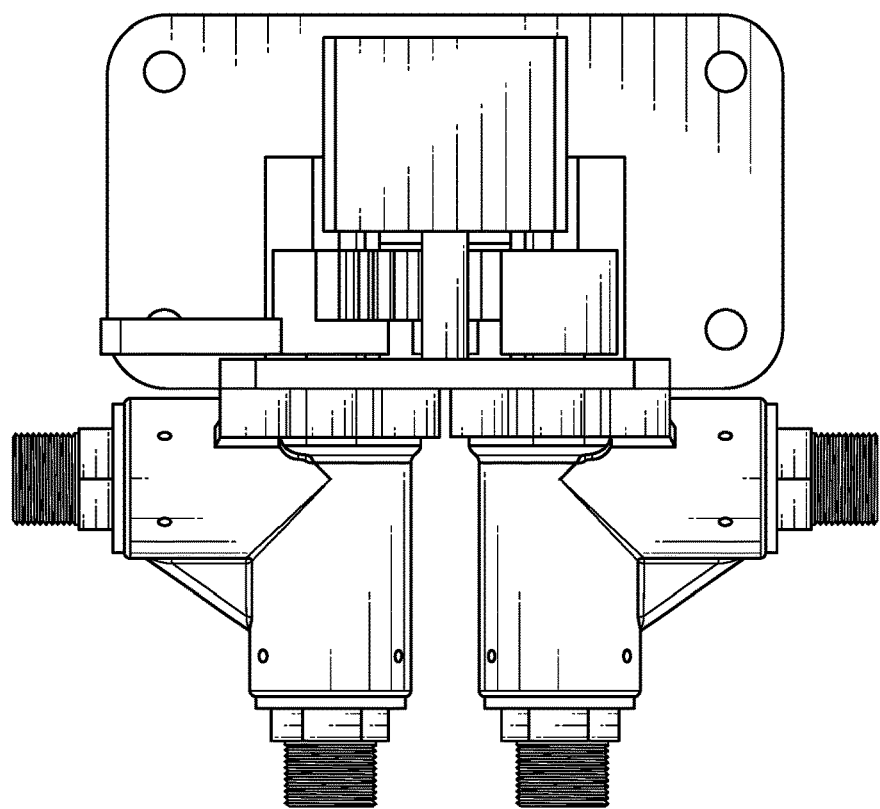
FIG. 5C depicts a back view of an embodiment of a main component of an AquaPedal System
Figure 5D:
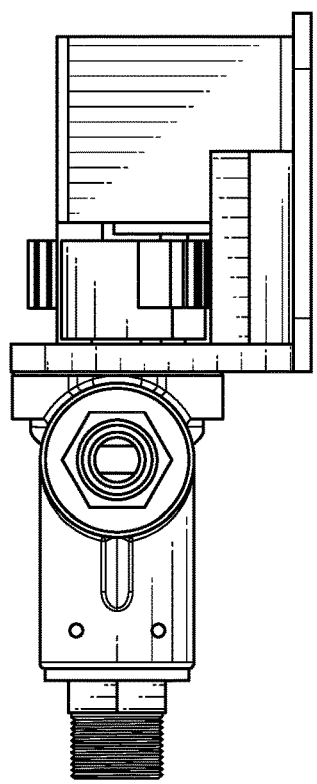
FIG. 5D depicts a side view of an embodiment of a main component of an AquaPedal System

FIG. 3 depicts foot pedal board 300 components relating to an electrical system that may include a power source 303 or battery, a micro switch 307 responsive to pedal commands or pedal positions, a processor 315 or pedal board processor and a multi position DIP (Dual Inline Package) switch 311. The foot pedal board may be easily configured to comport with other means of water control or actuators as described herein.

FIG. 4 depicts several views of a disclosed main unit. Disclosed features include fittings that allow attachment to a flow meter, gears between the valves to save space and other features.

FIG. 5A to 5D depicts various views.

FIG. 6 depicts an exploded view and shows a motor housing, motor driven gear 118, chassis, hot-water side gear 111 with manual override lever 110, hot water outlet 113, hot water inlet port 115, cold water gear 121, cartridge value 120, manifold 130 and modular fittings 135. In general, components for either hot and cold water share various forms of symmetry.

A manual on/off lever 110 may be attached to a hot water gear 111 and cold water gear 112. A chassis 104 may support and attach to a motor 117 with the motor attached to a motor driven gear 118, with the motor driving gear in geared attachment to a hot water gear 111 and a cold water gear 121. The hot and cold water systems may be similar in parts and nature.

The hot water system or fluid train may be similar to the cold water system, wherein the cold water system or fluid train may comprise a molded manifold 130 with the molded manifold defining a lower void with the lower void accepting water input and sometimes a modular fitting 135. The manifold or molded manifold may define a lateral void with the later void sometimes used for output and sometimes accepting a modular fitting. An upper void defined by the modular fitting may accept a cartridge valve 120 with the cartridge valve 120 comprising a stem 122 the cartridge valve may define a lower void used to accept fluid in a central void with the central void including a gateway void 119, the gateway void rotating in reaction to rotation to the stem attached to either the cold water or hot water gear. When the central void is facing the horizontal void of the manifold fluid will flow from the input to the output voids.

Figure 7:
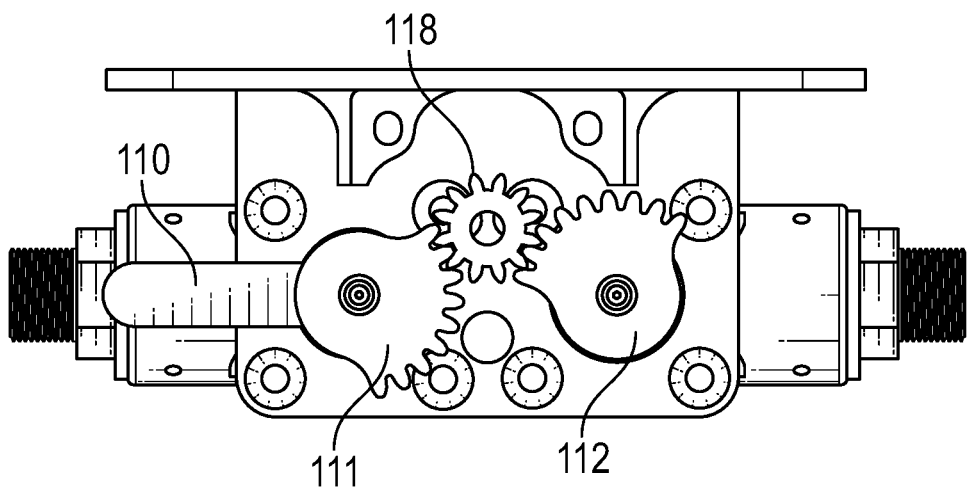
FIG. 7 depicts a top view of a main component of an embodiment of an AquaPedal System

FIG. 7 depicts the artful integration of a motor driven gear 118 in physical communication with both a hot water valve gear with manual override lever and a cold water valve gear. This configuration saves space and provides advantages over the prior art wherein hand operated levers are used, leading the transfer of germs. The artful gear configuration allows one motor driven gear to move a hot water gear and a cold water gear in the same direction while the motor driven gear moves in just one direction. Thus, the volume of water can be increased with a balance of both hot and cold water.

Figure 8:
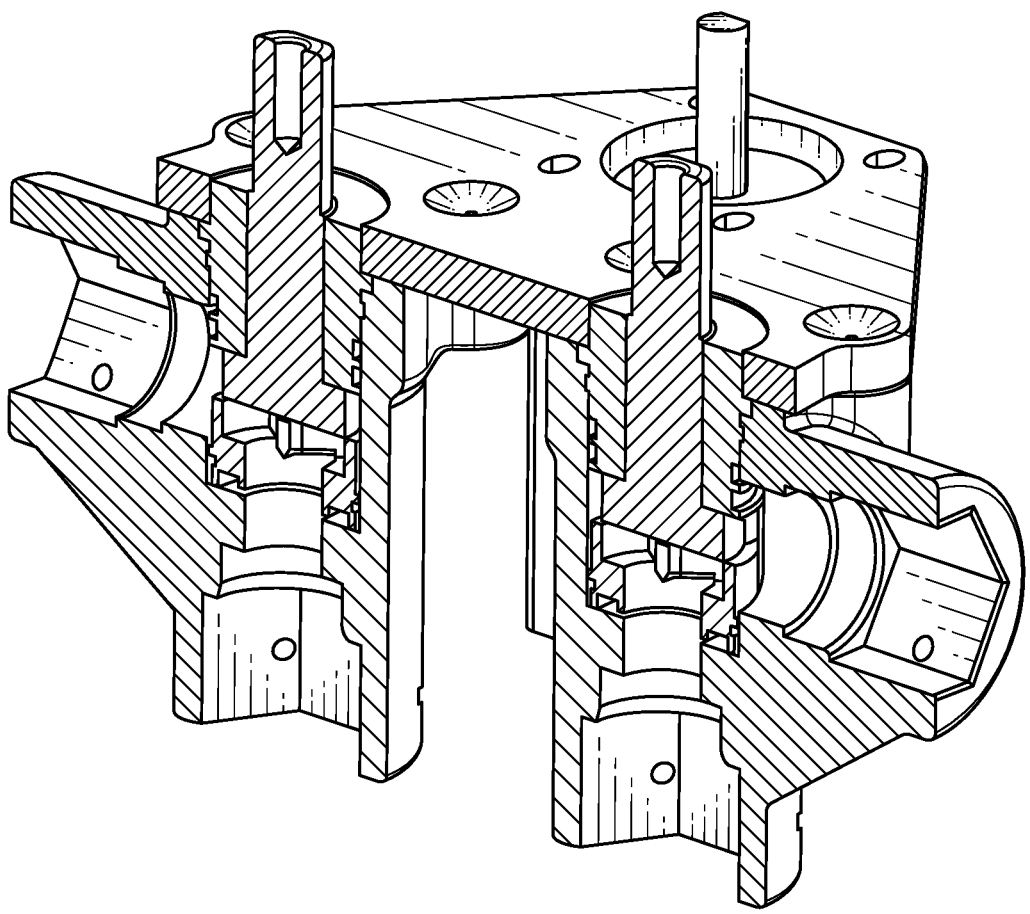
FIG. 8 depicts a cross sectional view of an embodiment of a main component of an AquaPedal System

FIG. 8 depicts sectional view of a main unit showing fluid pathways for both hot and cold water.

Figure 9:
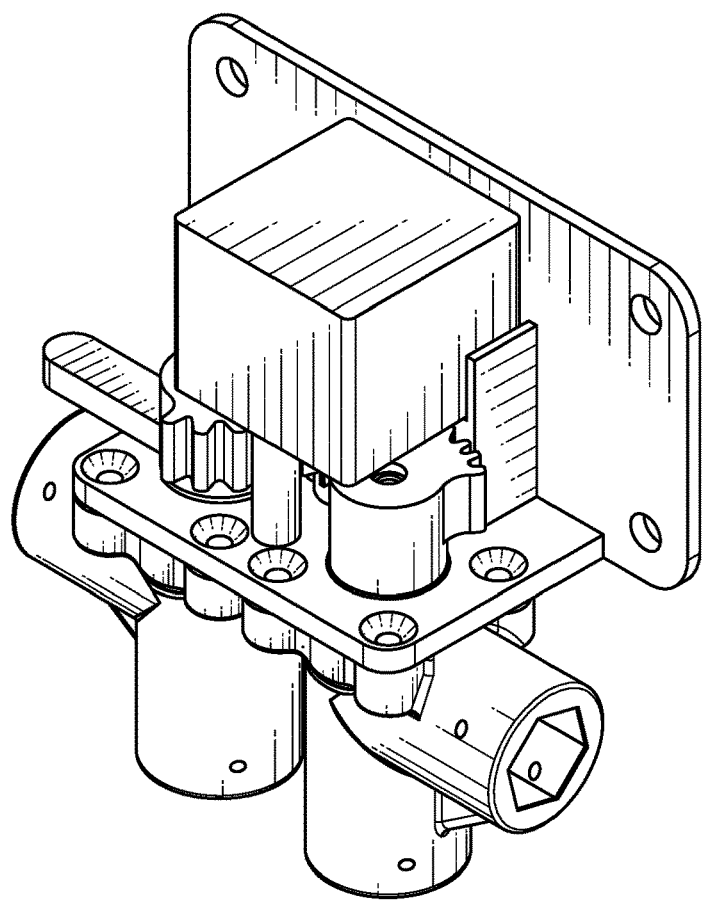
FIG. 9 depicts a perspective view of an embodiment of a main component of an AquaPedal System

FIG. 9 depicts a perspective view of a main unit with a motor disposed on top of a motor driven gear and other connecting components.

Figure 10:
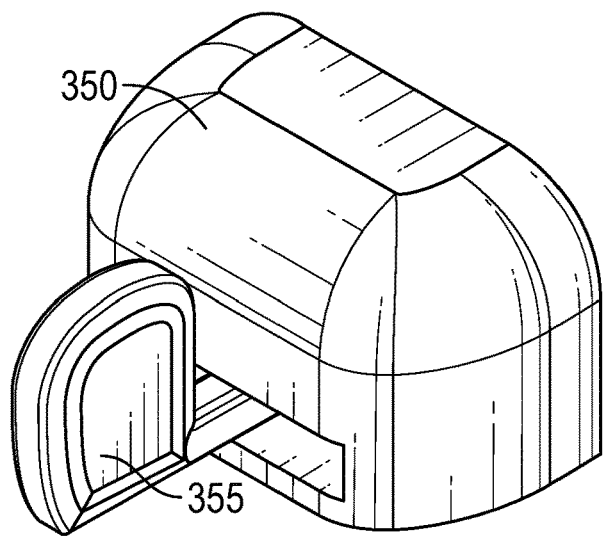
FIG. 10 depicts perspective view of a paddle actuator assembly of an AquaPedal System

FIG. 10 depicts a paddle assembly comprising a paddle 355 foot actuator arm 357 and paddle housing 350.

Figure 11:
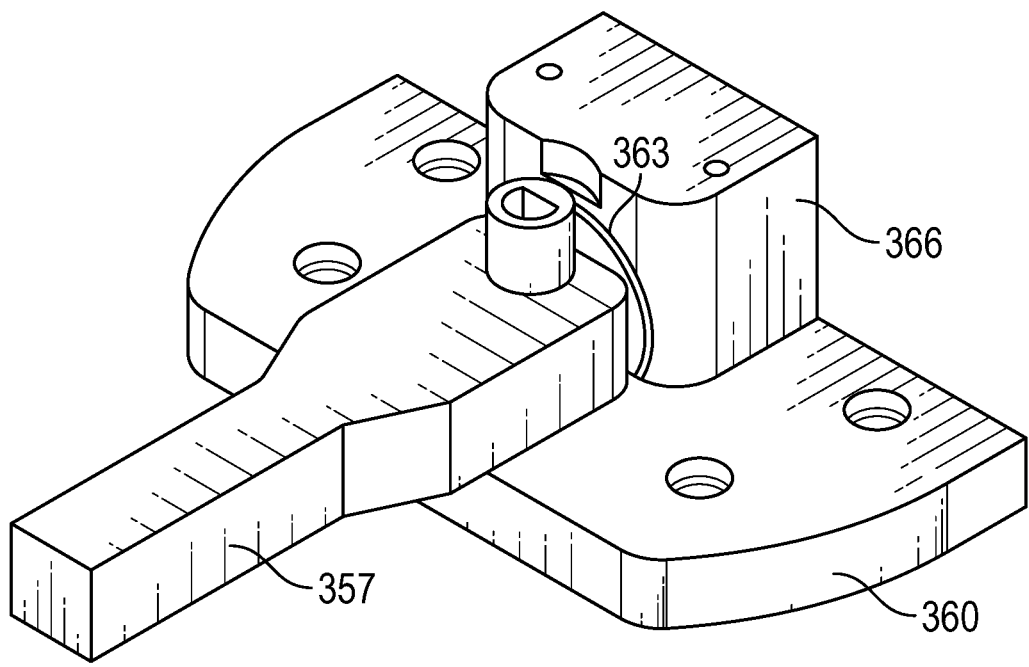
FIG. 11 depicts an internal view of a rod actuator assembly of an AquaPedal System

FIG. 11 depicts a paddle housing subassembly comprising a foot actuator arm 357 and spring loaded plunger 363. The disclosed arm or foot paddle 357 achieves new efficiencies by use of a spring loaded plunger 363 that provides a neutral bias to the foot paddle, thus the foot paddle returns to an off or neutral position when not moved or urged by a foot or other mechanical input. There is a mechanical and/or electronic connection between the foot paddle and the motor driven gear (see FIG. 6).

Figure 12:
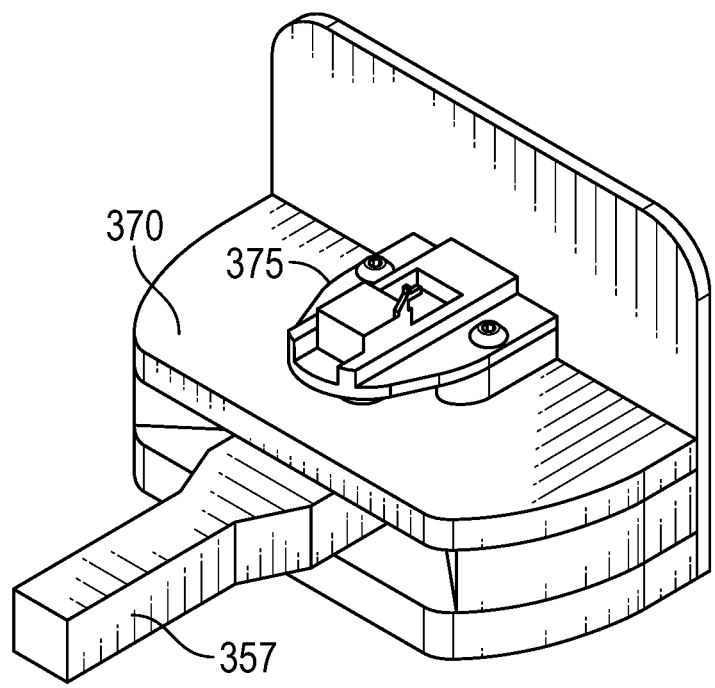
FIG. 12 depicts a potentiometer of a rod actuator assembly and other components of an AquaPedal System

FIG. 12 depicts a potentiometer 375 disposed over a paddle arm 357 with the potentiometer used to report the angle of the paddle or paddle arm to enable variable flow rate and or water temperatures.

Figure 13:
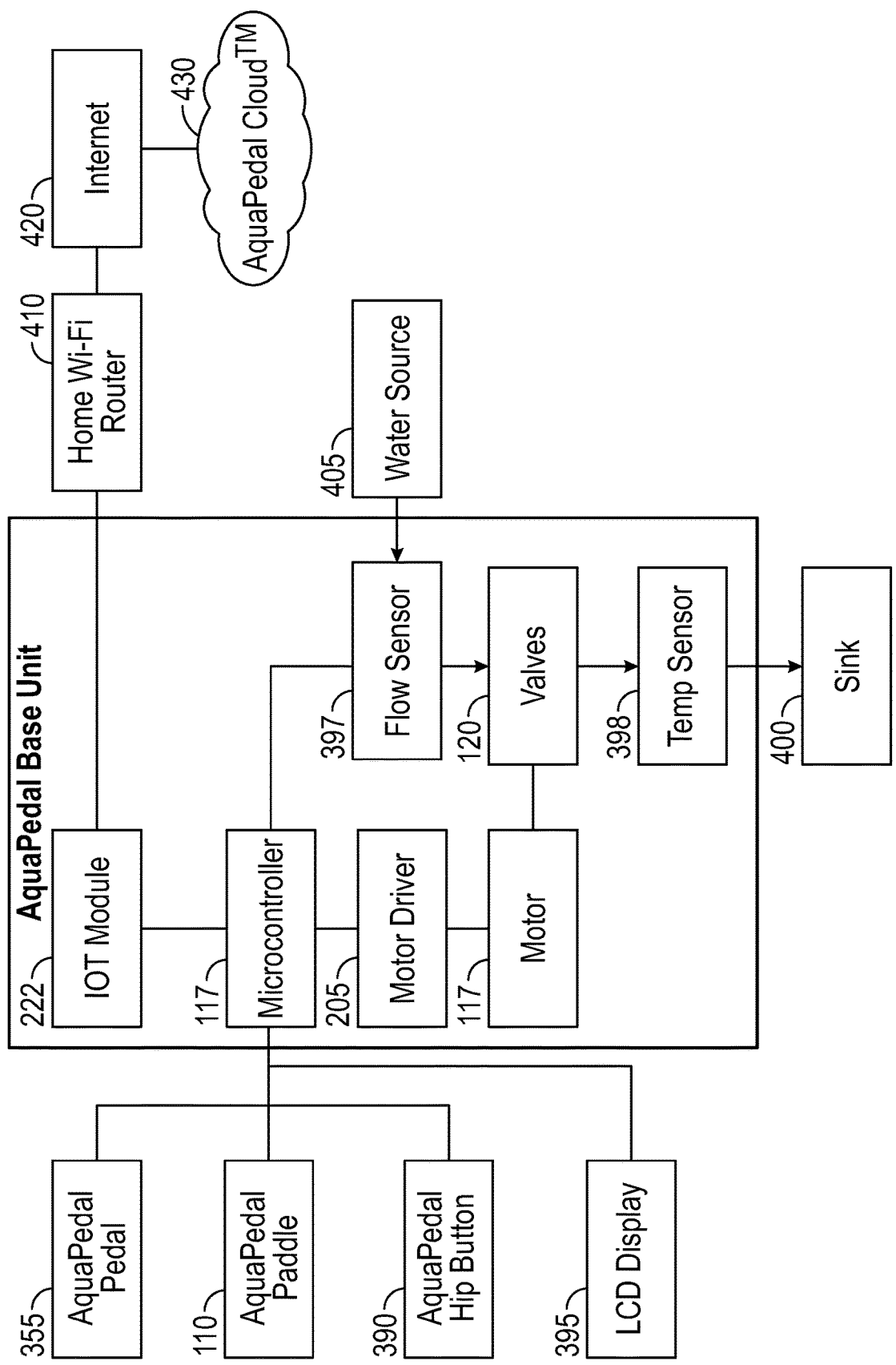
FIG. 13 depicts a disclosed architecture of an AquaPedal System

FIG. 13 depicts a system overview or flow chart. User control of water may be enabled by a plurality of actuators that may include a pedal, paddle, hip plate, button and other touchless systems such as voice command, motion detection and cameras. An display system, such as a LCD display may report system states, water usage and other data. An LCD or external display may show information about current and past usage, duration of usage, temperature and flow. It can be mounted anywhere. The wired version receives power and signal over a cable. The wireless version runs on batteries and the information is sent by Bluetooth and or Wi-Fi.

A first and second add on cartridge may contain flow and or temperature sensors. The first and second add on cartridges may be attached to a first and or second manifold.

User input may be received by a micro controller with the micro controller reporting to an IOT (Input Output Transfer) module with the IOT module sending information to a local internet gateway, such as a home Wi-Fi Router with the local internet gateway in communication with a wide area network, such as the Internet, with the transmitted data stored upon a remove database and server system sometimes referred to as an system cloud storage system or "AquaPedal Cloud."

In a disclosed embodiment, both the flow and temperature sensors will be mounted on the intake side of the AquaPedal. The temperature sensor should be located on the intake side of the hot water valve, as energy use will be computed from the temperature setting on the water heater or by algorithms based on the water temperature at the device. On the other hand, installing the temperature sensor on the faucet side of the unit could permit in the future a function that shuts either valves, or only the hot water valve, if the temperature of the water entering the spout exceeds a user-defined temperature. This could be useful in a house with young children, to avoid scalds.

Referring back to the micro controller or similar system device, information from a flowmeter may be sent to the micro controller and to valves. A micro controller may be in communication with a motor driver and motor. Valves may be in communication with a temperature sensor, with the temperature sensor disposed at or near a sink or other water area.

There are various nuances to the disclosed AquaPedal system that may include:

The pedal or other similar device used to control the flow of water to the end user may comprise a pedal mounted on the floor using magnets, double sided tape, screws or gravity only. In one contemplated method of use, an end user presses or urges in a downward direction upon the pedal to actuate the flow of water. In a similar motion used upon an accelerator in an automobile. A disclosed pedal may contain a sensor to detect the pressure input by the user. The pedal may be spring loaded and utilize proportional control. The more firmly the user steps down upon the pedal, the more the valves are opened increasing the flow of water. Like all of the other input devices, a double click may activate "always-on" mode. In this mode the water will stay on with full flow until any other actuation is made to the pedal.

As mentioned above, a paddle system is another disclosed system of fluid control and or fluid measurement. A disclosed paddle system may comprise a paddle mounted on the floor either using magnets, double sided tape or screws. The paddle system can be actuated by moving or urging the lever either left or right with the foot. And may contain a sensor to detect and report the angle of the paddle. The paddle may be spring loaded and returns to the center position when released. A paddle system may use proportional control to achieve a direct relationship between the amount or distance of value opening to the increasing rate of water flow. Like all of the other input devices, a double click will activate "always-on" mode. In this mode the water will stay on with full flow until any other actuation is made to the paddle.

As mentioned above, a hip plate or button is another disclosed system of fluid control. A disclosed hip plate system may comprise a large and easy to press plate which can be mounted in various locations either high or low to provide accessibility for all users. A plate system can be mounted to facilitate being pressed with a hand, hip, foot, or any other means. A plate system can be configured in three modes toggle, standard and delay mode.

Standard: In standard mode the valves are actuated when the hip plate is held down. When released the valves are closed. As with other input devices a double click will activate "always-on" mode. In this mode the water will stay on with full flow until any other actuation is made to the hip plate.

Toggle: If configured in toggle when the user presses the button once the valves are opened fully. A second press will fully close the valves.

Delay Mode: In delay mode the administrator of the system can choose how long the valves will stay open after a press. For instance, if configured for 10 seconds, a single press will cause the valves to open for 10 seconds and then automatically turn off. A Delay Mode can be combined with the other two modes, setting a maximum duration of water flow in either Standard or Toggle Mode.

Disclosed embodiments may include the use of a database and server system and applications or programs running on a user's computer or personal electronic device. Applications or consumer programs may include the ability to configure AquaPedal units, accounts, display usage/user interface, and participate in communities and gamification.

Locations, Zones and Tags

Disclosed systems may be given classifications which designate which site they are part of and the specific zone that the individual units are installed in. For example a unit's "venue" or "location" may be "Smith's Home" or "Building A". The "zone" or "location" is the specific area in that venue or location the system is installed. For example, "kitchen sink" or "upstairs bathroom".

In addition to the "location" and "zone," users can also designate one or more "tags". Tags are used to organize either multiple AquaPedals or individual AquaPedals into groups which can be used in multiple ways including data processing, organization, competitions and more. They provide a great base for organization as well as expansion of the system.

Example: A college is outfitting its entire campus with AquaPedals. In our case, the location for all units at this location will be set as "My College". A new base unit is being installed in the history building and specifically in a bathroom. The zone for this unit will be designated "History Building Bathroom 1/Sink 1". This unit will automatically receive a tag which matches the location "My College". In addition the user may add a tag or tags to this and all of the units in the history building called "History Department". Now when viewing the data online, the college can see how much water and energy use for the entire college "My College" and or specific tags such as the "History Department". Again multiple tags can be designated to get even finer granularity. In another example, an additional tag for each floor of the history building is added. Now the user can see that floor 2 of the history building used 5 times the amount of water as the other floors possibly indicating a leak.

Gamification

Users can participate in friendly competition in a multitude of ways. For instance one end user can challenge another end user directly using the website or app to see who saved more water during the week. There are many ways the competitions can be configured. By using "tags", they can also compete in groups against other groups. For example a community vs another community. An end user can also compete solo against a group. For example if she adds a tag "apartment x" which in this case represents her apartment building, she can view her progress against all of the other AquaPedals in "apartment x" These groups can be as small or as large as the user wants to participate in. The units will automatically receive certain tags which can be used for this reason.

Users can participate in friendly competition in a multitude of ways. For instance, a user could compete against him or herself. Users, especially younger children, could earn "points" for achieving defined levels or percentages of saving water and/or energy. Earned points could propel a figure along a course to a finish line, or could complete a drawing of a flower.

Other Disclosed Features of AquaPedal

Disclosed embodiments may comprise or be viewed as two independent but yet interconnected and interactive subsystems.

The first system or subsystem comprising a site-based system comprising base units that are physical devices connected to the hot and cold water pipes between the angle stop/household water supply and the faucets in a specific sink (an "Installed Sink") that enable a user to control water flow and duration by means of a pedal, paddle, or other actuator; and A second system or subsystem comprising a cloud-based subsystem that stores, analyzes, and displays data transmitted to it via Wi-Fi from "Cloud-Access" Base Units.

Working as in integrated system, the two subsystems of the AquaPedal System will enable users to proactively reduce water and energy consumption at any Installed Sink. Moreover, the two more feature-rich Versions of the Base Units, the "MVP+" and the "Cloud-Access" Versions (see below) will both have the capability to monitor, record/store, analyze, and display water and energy usage at every individual Installed Sink, and, in the most feature-rich AquaPedal Cloud Cloud-Access Version, at multiple Installed Sinks that can be aggregated into one or more by the installer/user-defined Clusters (see below), and/or into one or more AquaPedal-defined Communities (see below).

The AquaPedal System will also have the capability to gamify all data collected, and to make all collected data available for Big Data analysis by public and private entities. These subsystems and their components are defined and described below:

Base Unit/Installed Sink: A Base Unit is a site-based hardware and firmware system that controls faucet water flow at a single sink (an Installed Sink) by means of various types of wired or wireless actuators, such as, pedals, paddles, buttons, hip plates (or other ADA compliant devices), or voice that are connected to a motor controller (initially by a hardwired connection and later, wirelessly) and a single motor that uses reduction gears to open and close two ceramic disc valves simultaneously and progressively, thus permitting the user at an Installed Sink to control hands-free water flow and duration. Base Units and Installed Sinks both may comprise the AquaPedal System's Site-Based Subsystem.

There are three Versions of the Base Unit: "MVP," "MVP+," and "Cloud-Access," defined below:

All Base Units of every version may be manufactured with the necessary hardware and firmware to provide the capability, if activated at the factory, for the installer/user to (1) collect and store water-usage data (including: time of day, flow duration, gpm, and hot water temperature) on-site or at a dedicated cloud-based database located/residing at/in the AquaPedal Cloud-Based Subsystem; (2) analyze some or all such data locally or off-site in the AquaPedal's Cloud-Based Subsystem; (3) display analyzed water- and energy-usage data/information for a single Installed Sink, for Local and Affinity Clusters (see below), and for Communities (see below) by means of an on-site LED displays (alpha-numeric for MVP+; full graphical for Cloud-Access Base Units), and/or via users' smart phones or computers; (4) serve as the data hub (Hub Unit) to receive (via Wi-Fi, BLE, or wire) and store water- and energy-usage data from physically proximate Installed Sinks that have been user-aggregated into a Local Cluster, and also data from satellite water/moisture monitors (e.g., under refrigerators, washing machines, etc.), leak-detection sensors, etc. that have been included in that Local Cluster; and (5) transmit all such data to the Hub Unit, from which it can be transmitted to the Primary Database resident in the AquaPedal Cloud Subsystem.

Game challenges may be made between individual Installed Sinks, and between individual Installed Sinks and members of any Cluster or Community.

Local Clusters: Local Clusters are user-defined aggregations of physically proximate Base Units (i.e., all within Wi-Fi or BLE range of each other, or capable of being physically wired together) for which a specific Base Unit has been designated by the installer/user as the Hub Unit, and to which all other Base Units in the Local Cluster will report their respective water- and energy-usage data. All Local Clusters are first-tier clusters, and are created in/situated in/located in/residing in the AquaPedal's Cloud-Based Subsystem. Game challenges may be made within or between Local Clusters.

Some examples of Local Clusters are:

All the Installed Sinks in a single dwelling, (plus IOT moisture monitors, leak detectors, etc., if present);

All the Installed Sinks in a single third floor men's restroom in the XYZ Office Building—provided that all Installed Sinks are within Bluetooth/wifi range of each other (otherwise, these Installed Sinks would belong to an Affinity Cluster, see below);

All first-grade classroom Installed Sinks in the ABC Elementary School—also with the above proviso;

All the food-prep or clean-up Installed Sinks in a single food-service kitchen—again, with the above proviso.

Affinity Clusters: Affinity Clusters are user-defined aggregations of Installed Sinks that are not physically proximate. In an Affinity Cluster, each Installed Sink reports its data directly to the Primary Database resident/located in the AquaPedal Cloud-Based Subsystem and not to any Hub Unit. The Primary Database then aggregates the data into the user-defined Affinity Clusters. An Affinity Cluster that includes only individual Installed Sinks is a first-tier cluster. An Affinity Cluster that includes individual Installed Sinks, and/or Local Clusters, and/or other Affinity Clusters cannot be a first-tier cluster, and must be a nested x-tier cluster, where x refers to how many other Clusters are nested/included within its user-defined aggregate. Game challenges may be made within or between Affinity Clusters, Local Clusters, individual Installed Sinks.

An Installed Sink may simultaneously belong to multiple Local Clusters or Affinity Clusters, including "nested" x-tiered Affinity Clusters—i.e., Clusters that include all or some of the first-tier clustered Installed Sinks, but that also include additional (i.e., second-, third-, x-tier clustered) Installed Sinks. Some examples include:

All third-floor men's and women's restroom sinks in the XYZ Office Building: The Installed Sinks in each third-floor restroom would form separate, first-tier Local Clusters. These Local Clusters could be nested together to form a second-tier "all-third-floor-restrooms" Affinity Cluster that would collect and analyze the same data as the first-tier Local Clusters, but would aggregate all its collected data into the larger, second-tier user-defined Affinity Cluster, and would report its data directly to the Primary Database in AquaPedal's Cloud-Based Subsystem. An example follows:

A user-defined aggregate of all the Installed Sinks in the entire XYZ Office Building, could be classified as a user-designated Affinity Cluster that contains Installed Sinks in Local Clusters or other Affinity Clusters. However, a user could not categorize that building-wide aggregation as a Community unless that larger user-defined Cluster met the inclusion criteria for that particular Community set by the AquaPedal Cloud-Based Subsystem. (E.g., a Community of Office Buildings)

Communities: A Community is an aggregation of Affinity Clusters defined and managed by the AquaPedal Cloud-Based Subsystem. Individual Installed Sinks and Clusters that meet the specific inclusion criteria for a particular Community may be included in that Community. Communities can be nested. Examples of Communities include:

A specific college or university (e.g., Harvard, Sonoma State)

A grouping of college or universities (e.g., the Ivy League, the Seven Sisters, the Big 12 Conference)

A village, town, city, or other geopolitically defined government entity

A corporation (e.g., Apple) or a corporation's major subsidiaries (e.g., Colgate-Palmolive, Colgate Oral Pharmaceuticals)

Followers of a particular sport (e.g., skateboarders) or sports team (e.g., the Bay City Bomber team members and fans)

Local and/or Affinity Clusters.

All Communities are created in/situated in/located in/residing in the AquaPedal's Cloud-Based Subsystem. Game challenges may be made within or between Communities.

The AquaPedal Cloud-Based Subsystem: The principal purposes of the Cloud-Based Subsystem are to provide a platform/apps that enable users and/or third parties:

to generate default or custom-designed reports that analyze and display (graphically, numerically, or both) the water and energy usage and relative savings (both quantitatively and financially) of specific Installed Sinks, Clusters, and/or Communities.

to create reports that analyze any combination of the water-usage data (including: time of day, flow duration, gpm, and hot water temperature) that have been reported to the Primary Database within the Cloud-Based Subsystems.

For example, such reports could include: Current water and energy usage for a specific Installed Sink, or for all sinks in a specific Local or Affinity Cluster, for any criteria for Communities, including period-to-date usage; comparative usage, this period vs. usage in xyz prior period(s); average usage and rolling average usage; peak period usage; usage by sink type (e.g., kitchen, bathroom, utility room, wet bar, gazebo, etc.).

to enter current and/or historical cost data and/or historical water- and/or energy-usage data into the databases for their respective Installed Sinks, Local or Affinity Clusters, or Communities.

to permit individual users/Installed Sinks, Local and Affinity Clusters, and/or Communities to access the AquaPedal's Cloud-Based Subsystem water and energy data and gamification apps to compete with other individual users/Installed Sinks, Local and Affinity Clusters, and/or Communities on the basis of any report the Cloud-Based Subsystem is capable of generating for all AquaPedal users.

to permit local, state, and federal legislative bodies, water, environmental, and land-use agencies, utilities, and private companies to access and use the total or selected queries of the database data for Big Data analysis of faucet-water and related energy usage.

Fluid Motion-Measurement and Micro Leak Detection System

Figure 14:
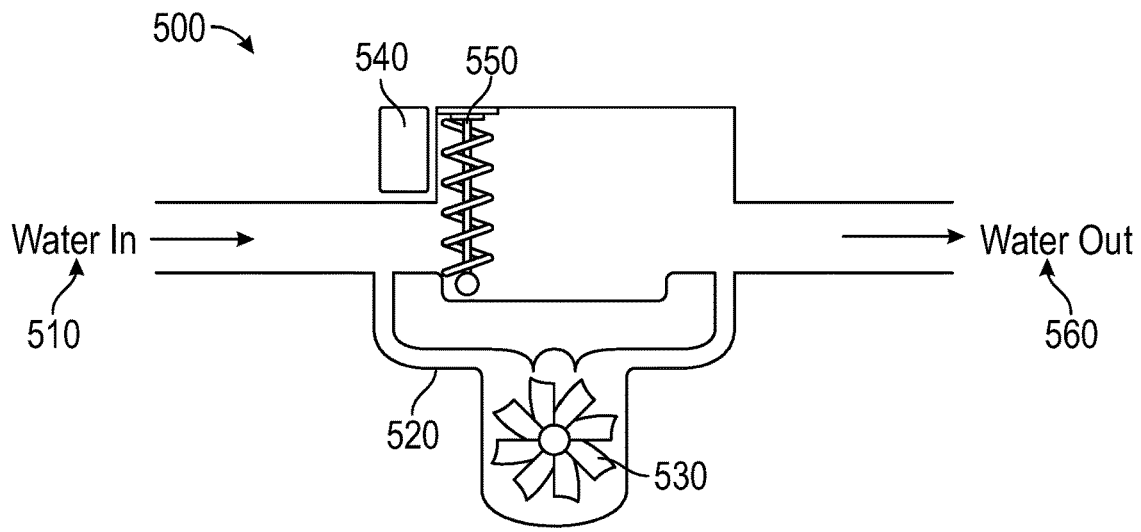
FIG. 14 depicts a disclosed Micro Leak Detection System having two chambers

FIG. 14 depicts a disclosed micro leak detection system sometimes used for toilets. In one disclosed embodiment, a spring-loaded gate valve opens at the flush surge-pressure for the respective installation (e.g., single-story houses, multi-story apartment or office buildings, etc.) pressure. A high-pressure sensor may be deployed to assist in reporting water pressure and/or to open or close the bypass valve. A theory of the invention is that many consumers are plagued with slow toilet leaks that are difficult to detect, or by slow water leaks in their dishwashers or washing machines and other appliances and plumbing fixtures. Once a slow water leak is suspected, a consumer may have trouble figuring out which water fixture or toilet is leaking. Thus, there is a need in the art for new means and methods of detecting and reporting slow water leaks.

The disclosed embodiments overcome shortfalls in the art by carefully employing a pinwheel flow meter only after the toilet bowl and tank have filled. The use of the above mention bypass valve or diversion gate keeps the pinwheel flow meter from interfering with the fast refilling of a toilet after flushing.

Disclosed embodiments include one or more sensors in communication with the gate valve and pinwheel.

In normal operation, or in a normal toilet condition, there will be no flow of water after a tank is filled, with the exception of a flush, which results in a large and sudden flow of water. After a tank is filled, the bypass valve or diversion gate is closed and the pinwheel is not moving, since no leak is present.

Where a flapper in a toilet is not functioning properly and allowing water to leak, after a flush, the tank slowly drains down about a quart before the float valve opens to refill tank. This fill time is high flow and short in time. This repeats based on the leakage rate. The short repeat fill times cause an alert that the flapper valve in the toilet is leaking. Thus, the system will inform the user of a specific toilet and suggest that the flapper needs to be replaced or adjusted.

Where the float valve is leaking, there will be a slow rotation of the pinwheel when the bypass valve is closed. This condition will cause the system to report a leaking float valve.

Where a flapper valve is stuck the tank will be continuously filling at a high rate without stopping. The continual filling of the tank will exceed the time limit for filling and the disclosed system will send an alert that the flapper valve is stuck open.

In the best mode known to date, the system is installed in a level or downward sloping water pipe, towards the toilet.

This first embodiment is sometimes referred to as a two chamber design, due to the second chamber or water pathway that crosses the pinwheel flowmeter.

Figure 15:
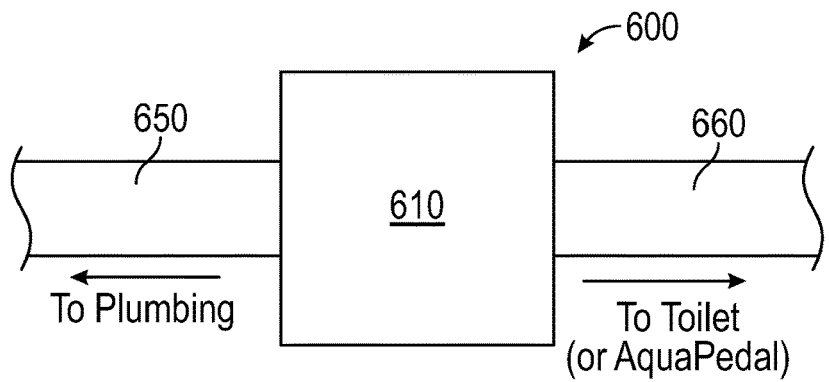
FIG. 15 depicts a disclosed Micro Leak Detection System having one chamber

FIG. 15 depicts an alternative embodiment toilet leak detector having a single chamber. This second or alternative embodiment may be inserted at the toilet angle stop. It is screwed onto the threads of the angle stop on one end, and on the other end, it is screwed on to the flexible hose connected to the toilet. Alternatively, it could also be inserted between the flexible hose and the toilet itself.

Figure 16:
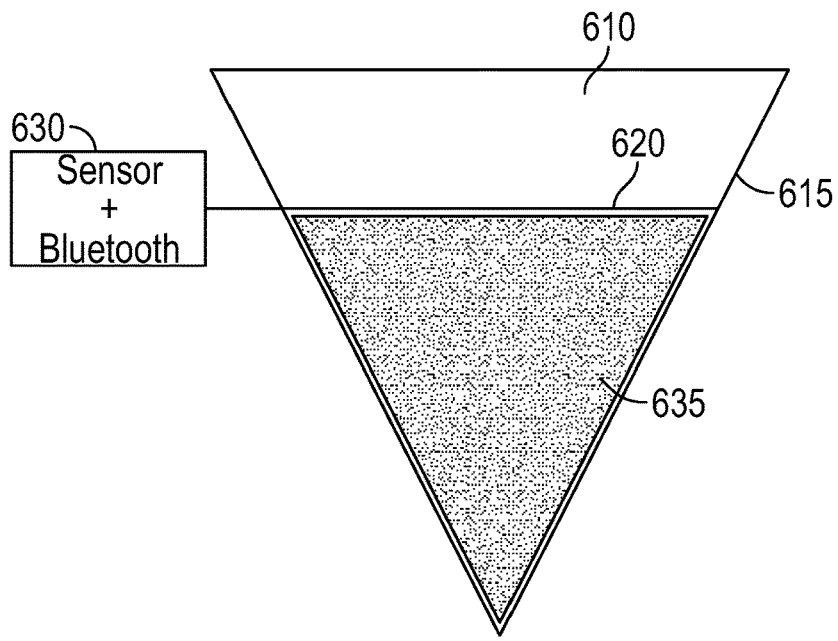
FIG. 16 depicts a sectional view of a Micro Leak Detection System FIG. 17 perspective view of dual channel micro leak detection system FIG. 18 exploded side view of dual channel micro leak detection system with spring and paddle FIG. 19 exploded perspective view of dual channel micro leak detection system with spring and paddle FIG. 20 top and side exploded perspective view of dual channel micro leak detection system with spring and paddle FIG. 21 side sectional view of dual channel micro leak detection system with spring and paddle FIG. 22 side perspective sectional view of dual channel micro leak detection system with spring and paddle FIG. 23 side perspective view of a single channel micro leak detection system with flap diaphragm FIG. 24 perspective view of a single channel micro leak detection system with flap diaphragm FIG. 25 perspective exploded view of a single channel micro leak detection system with flap diaphragm FIG. 26 top sectional view of a single channel micro leak detection system with flap diaphragm FIG. 27 front top perspective view of a single channel micro leak detection system with flap diaphragm FIG. 28 perspective sectional view of diaphragm in open position

FIG. 16 depicts a sectional view of a single chambered leak detector system.

The Micro-Leak Detector ("MLD") or alternative embodiment comprises four principal parts: The MLD housing; a thin diaphragm inserted within the MLD housing; a sensor/detector; and a data-logger/transmitter.

The MLD housing: The MLD housing is a threaded (described above) plastic or metal tube ("MLD housing"). It's length is as yet undetermined, but it will probably not be more than 4 inches or less than 2 inches in length. The diameter of the MLD housing is similarly as yet undetermined, but it will probably have an inner diameter equal to or somewhat less than the inner diameter of the flexible hose.

The MLD housing is most likely circular/round (i.e. a standard plumbing pipe); but, alternatively, it could be triangular, or any other shape (e.g., an oval, a square, hexagon, etc.) which enhances the functionality of the MLD. For example, it may be easier to detect a very minimal water flow in the MLD housing (i.e., a leak) if the floor of the MLD housing is flat rather than curved. In such a case, a triangle with the base down might be preferred; however, alternatively, the MLD housing could be an inverted triangle (i.e., with the point down) if that configuration would concentrate and enhance the water flow, thereby making a very minimal water flow easier to detect.

Since the MLD housing also has to accommodate the full flow of a toilet flush, it may be that the inverted triangle design is preferable, because it will permit large quantities of water to flow unrestricted through the larger section of the triangle, while at the same time channeling and amplifying the minimal flow of a leak at the apex of the triangle.

The MLD housing could also be made from transparent materials, such as PET or Lexan, which would then permit the detector, described below, to use a laser technology from outside the MLD housing to determine the position of the diaphragm, described below. Alternatively, other materials for the MLD housing that enhance other detecting technologies, such as ultrasound could be used.

The MLD housing (and diaphragm) should be triangular, pointed down, so that, whatever the rate of flow, the flow will be channeled and concentrated at the narrow end of the triangle.

The diaphragm: The diaphragm will be made of metal or a plastic compound material which permits its open-closed position to be sensed by the detector, described below. Thus, the diaphragm could be made of ferric metal or a plastic with magnetizable materials blended in. Alternatively, it could be made of any other material that the chosen sensor technology can detect, to determine the open-closed position of the diaphragm.

The diaphragm is attached to the inside of the MLD housing with a hinge at the top inside of the MLD housing— in which case, the entire diaphragm moves from that hinged point. It is possible that the diaphragm will be shaped such that, when fully open, it is flush with the side wall of the MLD housing. For example, if the MLD housing is circular, the diaphragm will be curved (like a Pringle), so that it moves fully out of the way to not impede the high-volume "flush-flow" (i.e., the water flow as the toilet is being flushed).

Alternatively, the diaphragm can have an axis located at the center of the diaphragm or at a different position in the diaphragm, probably above the center line. The diaphragm/ axis can be mounted within the MLD housing horizontally, vertically, or at any other position relative to the MLD housing and the flow of the water. In this case, the diaphragm rotates/moves relative to the axis in a manner similar to how the diaphragm in a gasoline-engine carburetor moves. Generally speaking, the bottom of the diaphragm would move/open up "downstream," and the upper part of the diaphragm moves "upstream." This configuration has the potential of creating the least interference and turbulence with the normal/maximum flush-flow.

The diaphragm fits snugly within the MLD housing, whatever the shape of the MLD housing might be, thereby not permitting any water—or, at least, any measurable amount of water—to flow past the diaphragm at the diaphragm's outer edge—without causing the diaphragm to open. In other words, if there is any water flow at all, it will move/activate the diaphragm.

The diaphragm is weighted at the bottom, so that its "default" position is closed. This could be accomplished by increasing the thickness of the diaphragm at the bottom versus higher up. The weight at the bottom of the diaphragm would not be sufficient to impede flow at the rate/volume common in small toilet leaks. Alternatively, a spring of some sort with very low force or a very weak magnet could keep the diaphragm closed.

When there is a leak, the diaphragm will be opened to some degree by the water flow. In one alternative, the sensor, described below, could simply sense the difference between "open" and "closed," which would be sufficient to alert maintenance personnel that the toilet has a leak ranging from extremely small/unnoticeable (visually or acoustically) to larger/noticeable. Alternatively, the sensor could determine the actual degree of openness of the diaphragm, and thereby possibly enable the diaphragm to serve as an actual flowmeter.

In one disclosed embodiment, the diaphragm should only be ⅔-¾ the height of the MLD housing. This will allow water to flow unimpeded above the diaphragm, momentarily faster than the water below the diaphragm that must push up the diaphragm. According to Bernoulli's principle, the faster moving water above the diaphragm will produce a slight lift, thereby helping to raise the diaphragm and maintain it in a fully open position.

The sensor/detector: The sensor/detector ("sensor") senses the physical movement and/or position of the diaphragm. The sensor can be mechanical, pneumatic, electrical, electronic, magnetic, laser, sonar, or of any other design that permits the sensor to recognize that the diaphragm has opened to any degree.

The sensor would contain electronic circuitry that the user could set to ignore flush volumes or any other volume of water activating the diaphragm. In other words, either at the factory or using an interactive app, maintenance personnel could set the sensor to ignore or record maximum and minimum flow rates.

The sensor could be a simple on/off device, or it could be calibrated to record actual flow rates or changes in flow rates, determined by the angle of the diaphragm. (This assumes that a higher flow rate will raise the diaphragm higher than a lower flow rate.)

The data-logger/transmitter: The data-logger/transmitter would have a capacity to record flow for any desired length of time from 24 hours to one week to 30 days. The data logger would have the ability to identify a specific toilet by serial number or some other electronic signature, including GPS, located in the sensor or IOT technology. The transmitter would most likely be low power Bluetooth, with a range of 0 to X feet. Maintenance personnel could be in direct proximity of the MLD, picking up the signal from the individual toilet or through toilet-stall doors or other bathroom fixtures, if the maintenance personnel is inside a restroom with multiple toilets. Alternatively, in a hotel context, for example, the maintenance personnel could walk the halls of the hotel, recording the data from each individual room.

Shower Stall Ambient Air Heater System Using a Bi-Directional Fan, and Temperature-Controlled Exhaust Vent Flapper By observation, the principal reason why shower users leave the water running when they are not actually using it is because they use the water to keep their bodies warm, either by maintaining part of the body under the water stream or by experiencing the warmth of the steam/heated water vapor. Thus, if a device can be installed in a shower that keeps the body warm without running the water, this device could save substantial quantities of water without inconveniencing or causing the shower user to experience cold or any such physical discomfort.

This device would be most efficient if installed in a shower with glass enclosure, creating a mini environment cut off from the rest of the bathroom. The device will also function, albeit less efficiently, in a shower that has just the shower curtain, or, indeed, no partition between the shower/bath and the rest of the bathroom.

The device would be installed in the ceiling directly over the shower stall. It would consist of a heater, a blower/fan that would use forced air to heat the air in the area surrounding an individual in the shower stall. An optional configuration would also include an evacuation fan that would pull the moisture-laden air/steam out of the shower stall and into a ventilation system.

The device may need a flapper/damper to close off the exhaust vent when the intent is to keep the shower area warm or have a steam bath. The closed damper could trap the heated air in the shower stall and passively heat the area, or a heating element could be built into the bi-directional fan.

The device would have a motion sensor. When it sensed the presence of someone in the shower stall, it would turn on both the heating element and the blower. An optional feature could be a temperature sensor that would regulate the heating element first, on the ambient temperature of the shower stall, and, second, on the temperature of the shower stall as the shower progresses. A temperature sensor could prevent the shower stall air from being overheated by turning off, or turning down, the heating element at the outset (for example, if the shower is taken during the daytime in the summer) or at any point within the duration of the shower.

The blower could have multiple nozzles that would direct the heat to the front, rear, and center of the shower stall. These nozzles could have their position(s) and direction(s) fixed at the factory, or they could be adjustable, as are the vents over an airline seat. Alternatively, and more simply and economically, the slats on the cover plate of the device could be angled so as to direct the hot air forward, backwards, and straight down.

When the motion sensor detected that the shower-user had left the shower stall, it would turn off the heating element and reverse the fan, so as to evacuate moist air and steam from the shower stall and the bathroom. Removing the hot, moist air from the bathroom environment could reduce maintenance costs by helping to preserve the paint and by discouraging the growth of mold. In any event, it would almost certainly improve the user experience in the bathroom, because attempting to use a steamy mirror and being present in a high-humidity environment is unpleasant for most people.

If the shower stall area is sealed with a glass enclosure, then the system could also serve as a mini-steam room. This feature would provide the (presumably) hotel property with a premium amenity, which would enable the property operators either to charge more for the room or to increase their occupancy rates.

To serve as a mini-steam room, the heater could have a setting that would heat the air to a significantly higher temperature than would be necessary or appropriate merely to maintain the comfort of the shower-user. Activating the mini-steam room function could be controlled by a light switch/button outside the shower stall, or by a button within the shower stall or on the device itself, or by voice command, or by any other appropriate means. When in this mode, the device could have an automatic shut off after a predetermined period of time in operation; this could either ensure that the shower user is not endangered by excessive heat, or to ensure that the device does not burn itself out or use too much electricity unnecessarily. Alternatively, the device could also be thermostatically controlled, permitting the shower-user to determine the ambient air temperature within the shower stall and even the duration of the operation of the heater.

Shower Head

This showerhead employs the same principle of increasing water pressure that was used, for example, for water cannons/monitors by gold miners in the Sierras. The principle involves successively reducing the diameters of the housings carrying the water in stages, and, thereby increasing the pressure of the water flowing through those successively reduced diameters. In the Sierras, the flow rates and water volumes of mountain streams were thus transformed into high-pressure water streams that were sufficient to rip away topsoil, trees, and even boulders in the process of exposing surface gold veins.

Apart from its water-saving features and benefits, is an adjustable water-saving showerhead. That is, there is a lever on the side of the shower head that the shower-user would turn to select the characteristics his or her preferred water pressure and flow rate. This mechanism is present in, for example, the Speakman® Any Stream showerheads and in many other brands. This common mechanism permits the shower-user to select the water stream/pressure from sharp, high-pressure needle-like thin streams of water to "fatter," thicker, softer, lower pressure, higher volume streams of water by moving a grooved piston in and out of the shower head body. The grooves on the piston are such that when the pistons are less exposed/deeper into the body of the shower head, the water comes out with a sharper, higher pressure flow; and when the pistons are more exposed/further extended from the body of the shower head, the water flow is softer and the individual streams are fatter and at a perceived lower pressure. Alternatively, the mechanism for determining the characteristic of the water flow can be selected by the shower-user turning a ring on the front of the shower head that would serve the same purpose, possibly even adding a pulsing function. This latter mechanism would be similar to those mechanisms appearing in many hand-held showerheads.

In this invention, in addition to the lever or ring described above to change the characteristic of the water flow, there would be a second lever on the showerhead that would determine the actual volume of water flowing through the showerhead—not it's perceived pressure or feel. Please note, however, that if these various mechanisms for changing the characteristics of the water flow cannot be successfully combined with the water-saving functionality of this showerhead, they would be eliminated from the design.

The second lever (where the only lever, under the circumstances described above) would be used to select the water volume flowing through the showerhead. Volumes could be fixed, or, alternatively, possibly variable and user-determined. The fixed volumes would range from off/trickle (i.e., no flow or only the minimal flow legally required in some jurisdictions), to low-volume, to mid-volume, and to full volume. Alternatively, there could be only three fixed settings, off/trickle, low-volume, and full volume.

Alternatively, instead of a lever, activation could be by voice or some other mechanical, pneumatic, electrical, or electronic device/mechanism.

Moving this lever would rotate into place a series of tapered tubes mounted on a wheel. Each would align with a piston in the showerhead. The tapered tubes for all water volumes would be mounted on this wheel. For example, if there were three water volumes and six pistons, 18 tubes would be arranged on this wheel, such that when the shower-user selected a particular water volume, (e.g., low-volume), the appropriate tubes for that volume would be aligned with the several pistons. (The pistons would be arranged in a circular pattern, which appears to be the standard configuration; the number of pistons could range from 1 to 8+. There could be two or more concentric rings of pistons. Alternatively, there could be only one or two pistons.)

At the water-supply end of the tapered tubes (i.e., where the water flows into the showerhead from the plumbing system), the tubes would be sealed with discs with different orifices that would permit greater or lesser water volumes to flow into the tubes. The lever (or other actuation mechanism) permits the shower-user to regulate water volume at the showerhead, rather than at the faucets. This has the advantage of permitting the shower-user to determine and change water volume without unintentionally also changing the temperature of the water—which is what always happens when a shower-user attempts to change water volume using a two-handle shower faucet (i.e., he or she will have to independently adjust both a hot faucet and a cold faucet) when desiring to change only the water volume. This unwelcome result also happens with many single-handle shower faucets.

The tubes rotated into place are increasingly tapered. Specifically, the tubes conveying full-volume flow have the least taper, if any, while the low-volume tubes have the greatest taper, and, thereby, have the greatest increase in water pressure with respect to the pressure of the water flowing into the showerhead from the plumbing system. (The off/trickle setting might not require any taper, as the water would either not be flowing at all, or would trickle out of the showerhead without any pressure behind it.)

If the tapering of the tubes is not sufficient to increase the perceived water pressure on the skin/flow rate exiting from the showerhead, an additional chamber situated between the orifice reducer and the plumbing system (or elsewhere, as dictated by principles of fluid dynamics) might be necessary to further increase the water pressure at any given water volume.

Depending on whether or not this tapered-tube system is independently sufficient to maintain the same sensory perception of water pressure on the skin/flow rate at any given water volume, it may what my doing be necessary to simultaneously adjust the positioning of the pistons to further increase the perceived flow rate and pressure of the water on the shower-user's skin. If it is necessary to adjust the position of the pistons to maintain the same perceived water pressure on the skin/flow rate, moving of the lever would also cause the pistons to move in or out an appropriate distance to maintain the same perceived water pressure on the skin/flow rate at the different water-volume presets determined by the lever.

Alternatively, and in its most basic and simplest form, this showerhead would have the pistons preset to the same perceived pressure on the skin/flow rates for the different water volumes, so that the shower-user could not set a personal preference with respect to the flow rate/sensory perception for any given water volume.

At all water volumes, because the tapered tubes increase the water pressure flowing from the showerhead, the shower-user would not perceive on his or her skin any change in water pressure that is otherwise invariably associated with changing the water volume of a shower, whether there is a reduction or increase of water volume used.

Using the lever to alternate between low-volume and full volume saves the shower-user the time and bother of adjusting water volumes for the different phases of taking a shower. For example, when the shower-user initially steps into the shower, he or she will probably want to have the highest water volume possible, to get wet overall as quickly as possible. Then, when the shower-user is fully wet, he or she may then decide to either turn the lever to off/trickle or to low-volume. After he or she is fully soaped up and ready to rinse, the shower user might then move the lever to the full volume position and once again experience more water flowing from the showerhead.

What distinguishes this showerhead and makes it unique among all showerheads I have seen is that at any water volume, from low-volume to full volume, the shower-user perceives the same water pressure on his or her skin/water flow from the showerhead.

Figure 17:
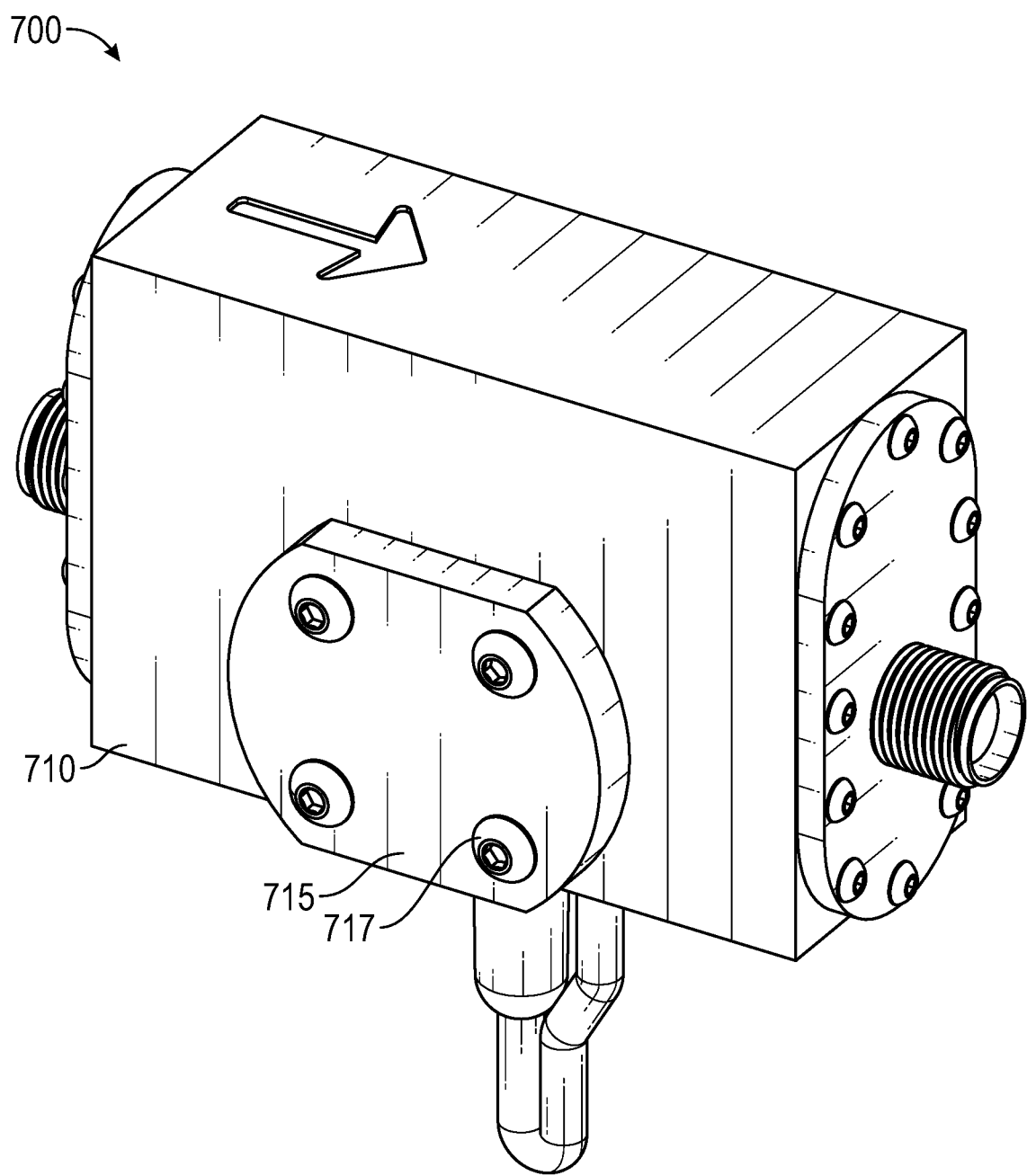

Dual Channel Fluid Motion-Measurement and Micro Leak Detection System with Spring and Paddle Wheel FIG. 17 presents a perspective view of a dual channel micro leak detection system 700 having a body 710 and top plate 715.

Figure 18:
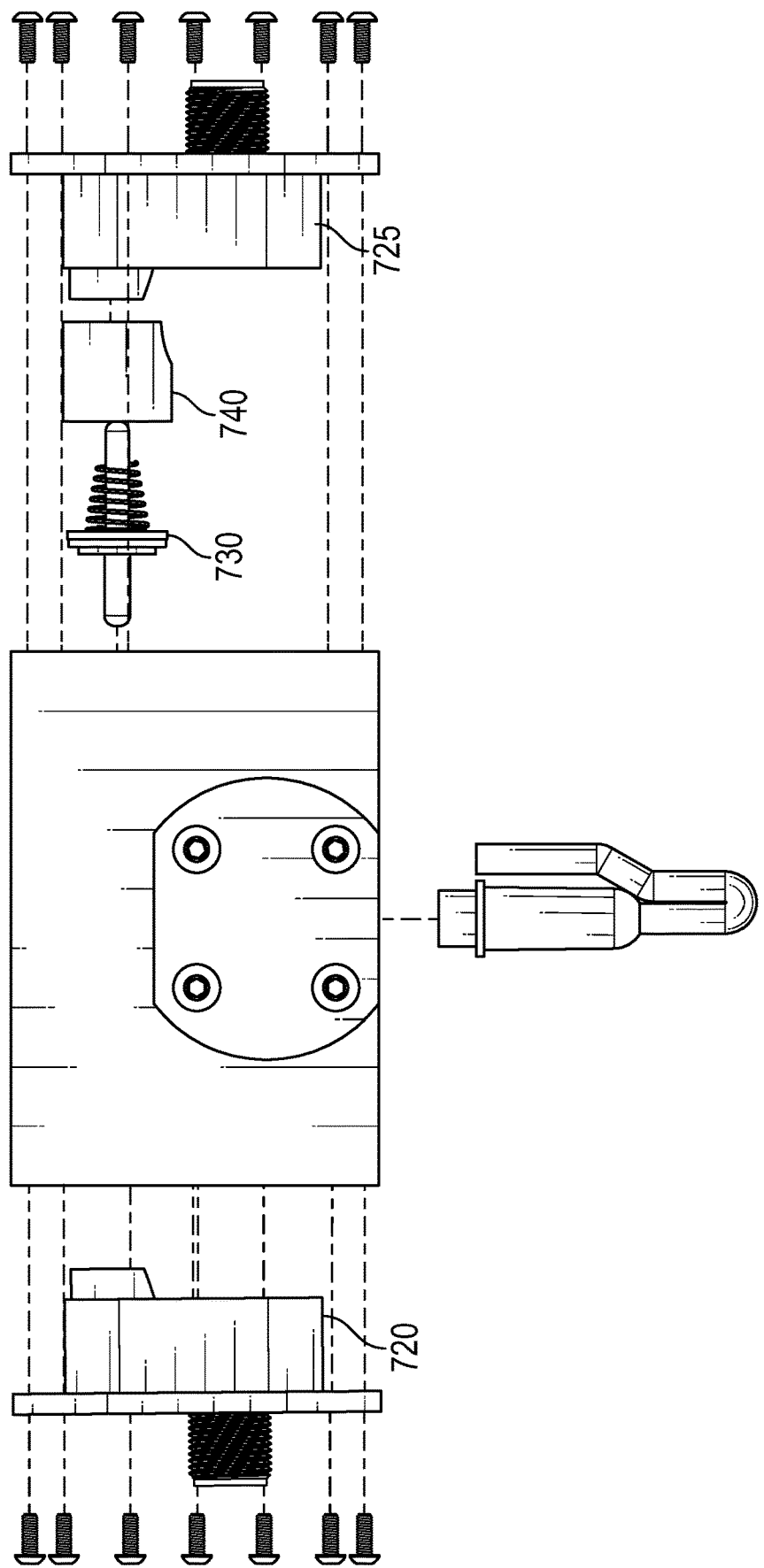

Referring to FIG. 18, an exploded view depicts an outlet adaptor 725, an inlet adaptor 720, a piston retainer 740 and a piston assembly 730.

Figure 19:
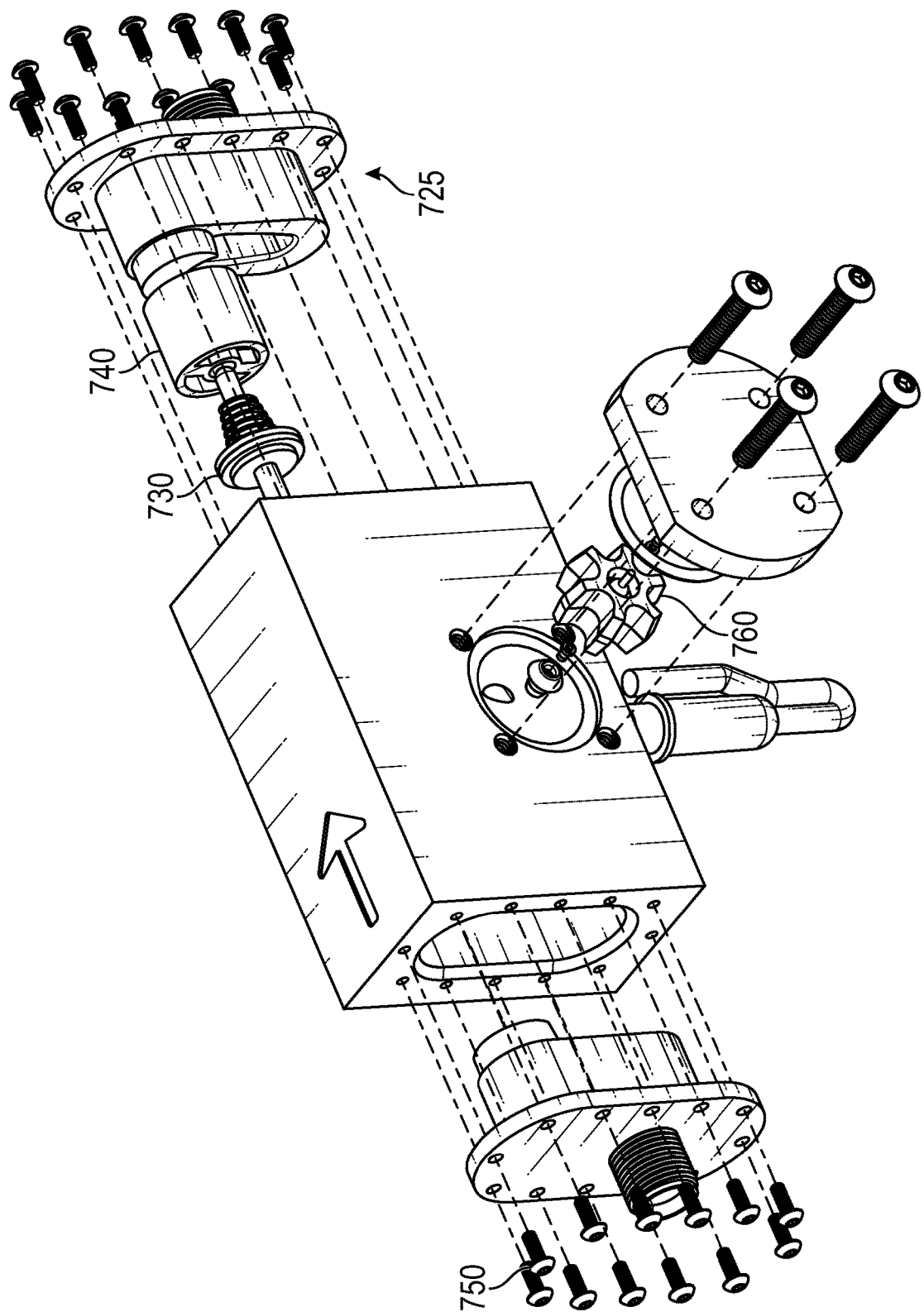

Referring to FIG. 19, fasteners or flexible fasteners 750 may retain the various components within the body. A piston retainer may contain or house a piston or piston assembly 730. In the paddle wheel area, a paddle wheel assembly 760 is secured into the main body.

Figure 20:
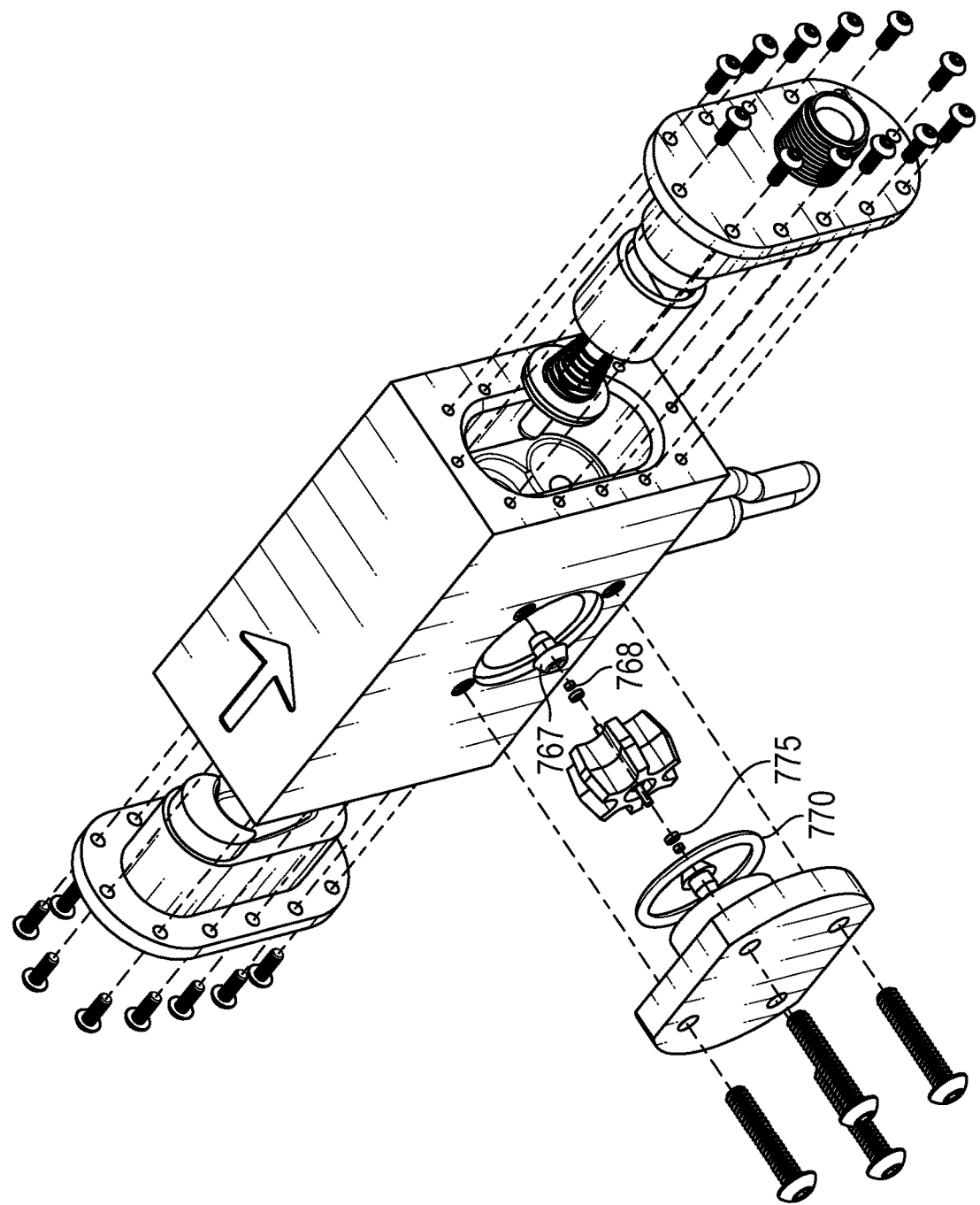

Referring to FIG. 20, paddle wheel assembly parts may include a top O-ring 770, a radial jewel bearing 775, a jewel bearing insert 767 and a linear jewel bearing 768.

Figure 21:
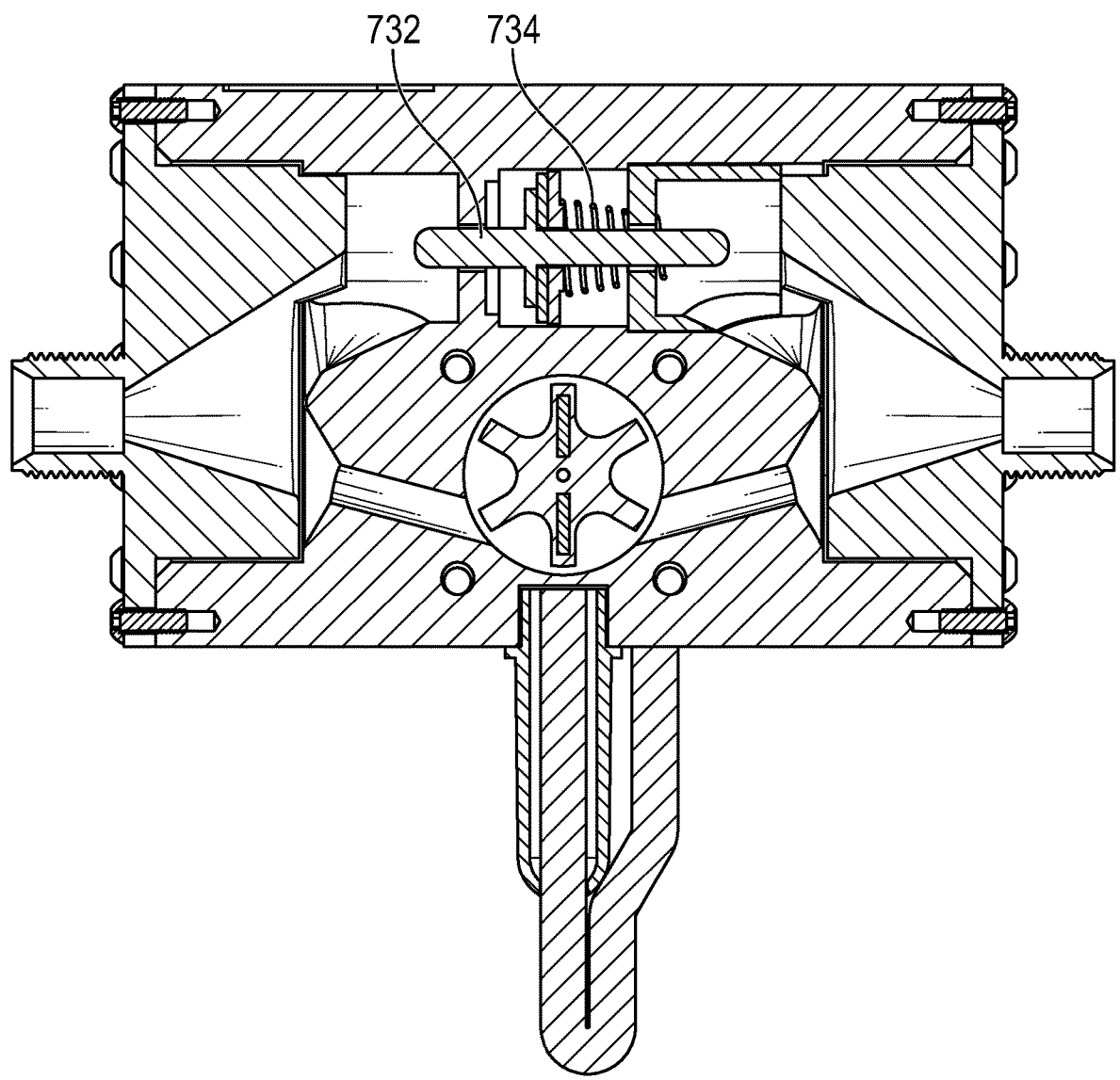

Referring to FIG. 21, the upper or secondary flow change may include a piston 732 and a spring 734.

Figure 22:
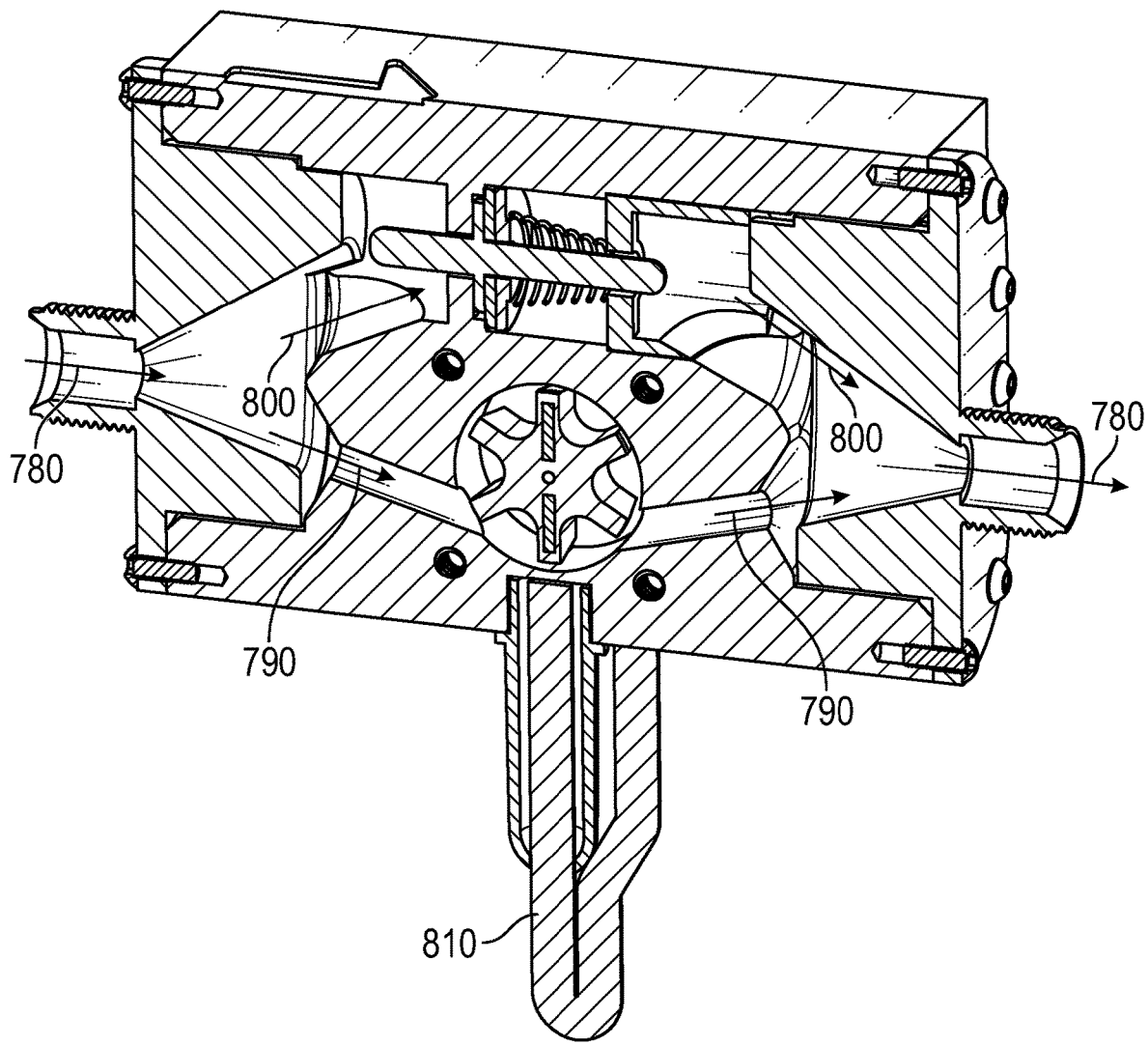

Referring to FIG. 22, the body of the system may define a default, first or lower channel 790 and an upper channel 800. Water may flow from an inward direction 780 and exit after moving the paddle wheel.

Figure 23:
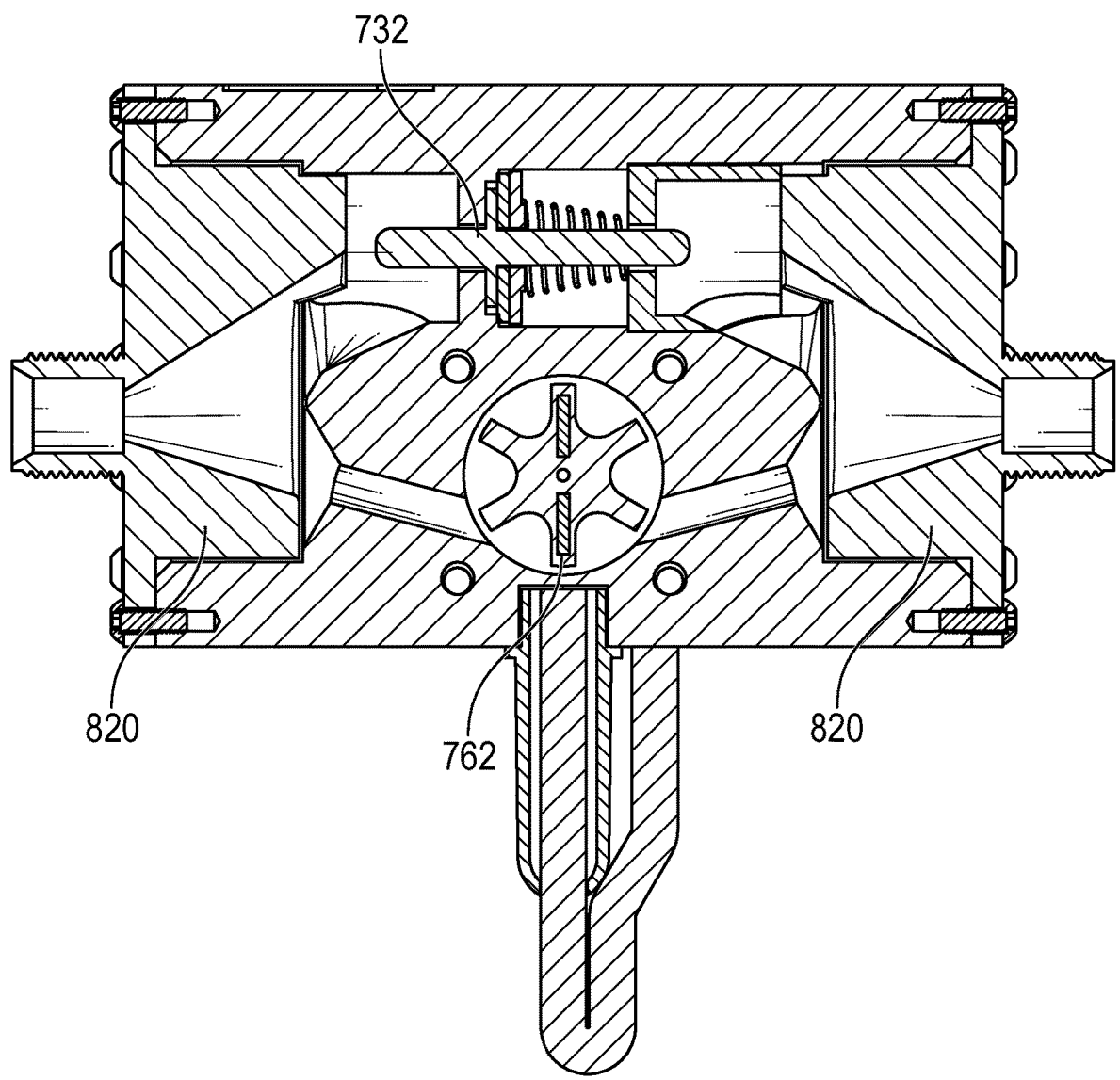

Referring to FIG. 23, a disclosed embodiment may include on or more end caps 820, a paddle wheel and a piston 732.

Figure 24:
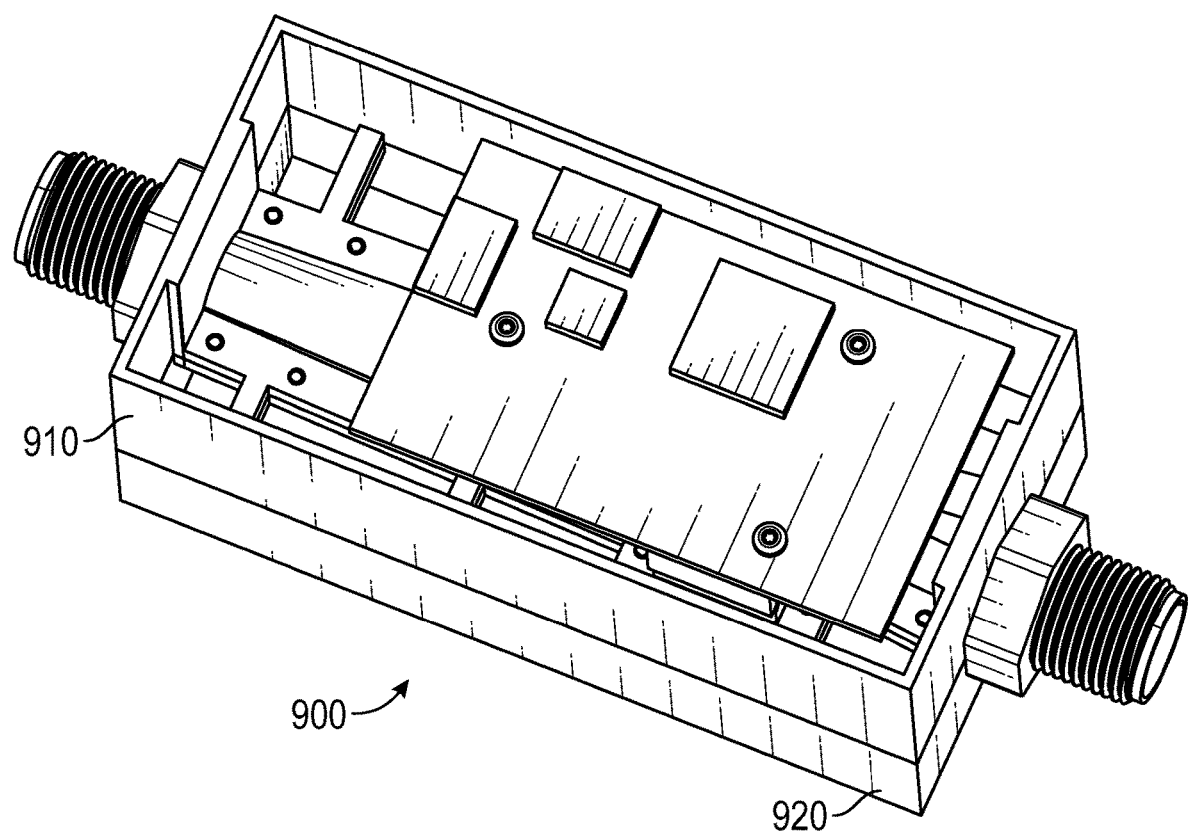

Referring to FIG. 24, a single channel micro leak detection system 900 with flap diaphragm may comprise an upper body 910 and a lower body 920.

Figure 25:
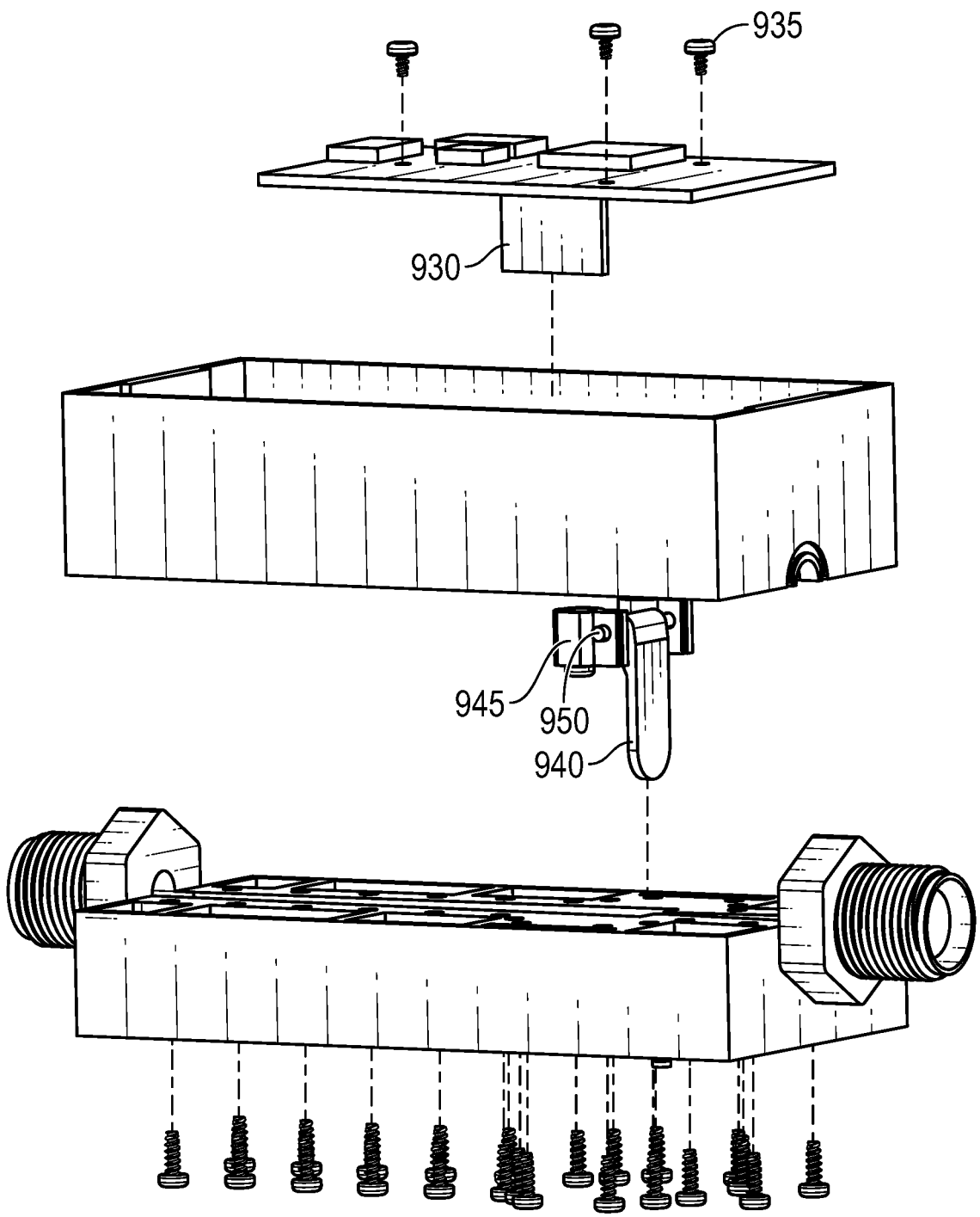

Referring to FIG. 25, an embodiment may include a printed circuit board assembly or PCBA 930 disposed near a diaphragm bracket 845, a diaphragm 940 and diaphragm magnet shaft 950.

Figure 26:
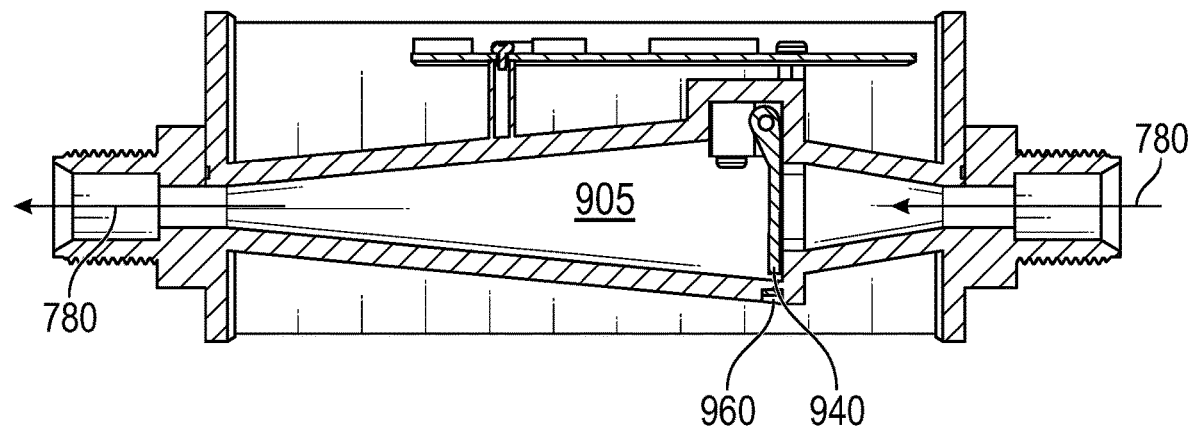

Referring to FIG. 26, an embodiment may define a main void 905, a diaphragm flap 940 and a magnet 960 adjacent to the flap with the flap is in a closed position.

Figure 27:
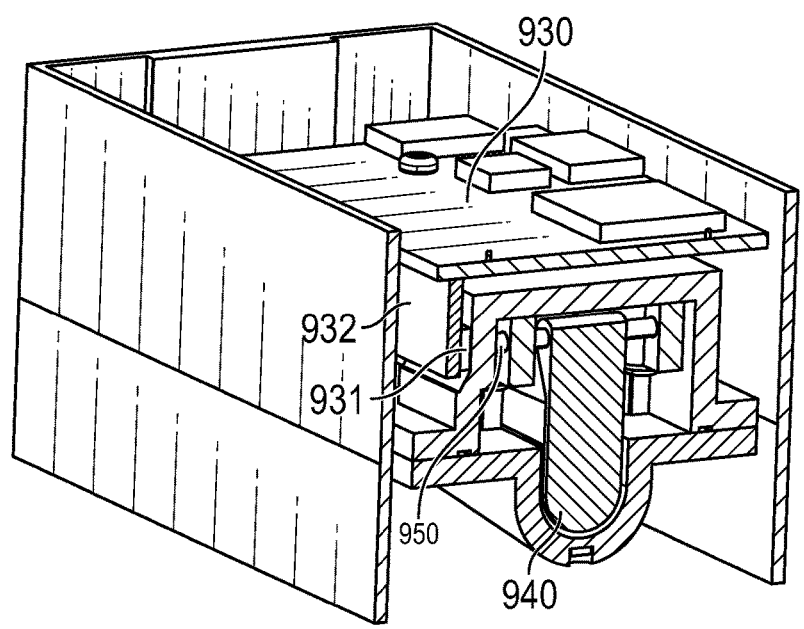

Referring to FIG. 27, an embedment may comprise a PCBA 930, a PCBA 932 mounted to a daughter card, a magnetic rotational sensor 931 on a PCBA, a diaphragm magnet shaft 950, and a flap 940.

Figure 28:
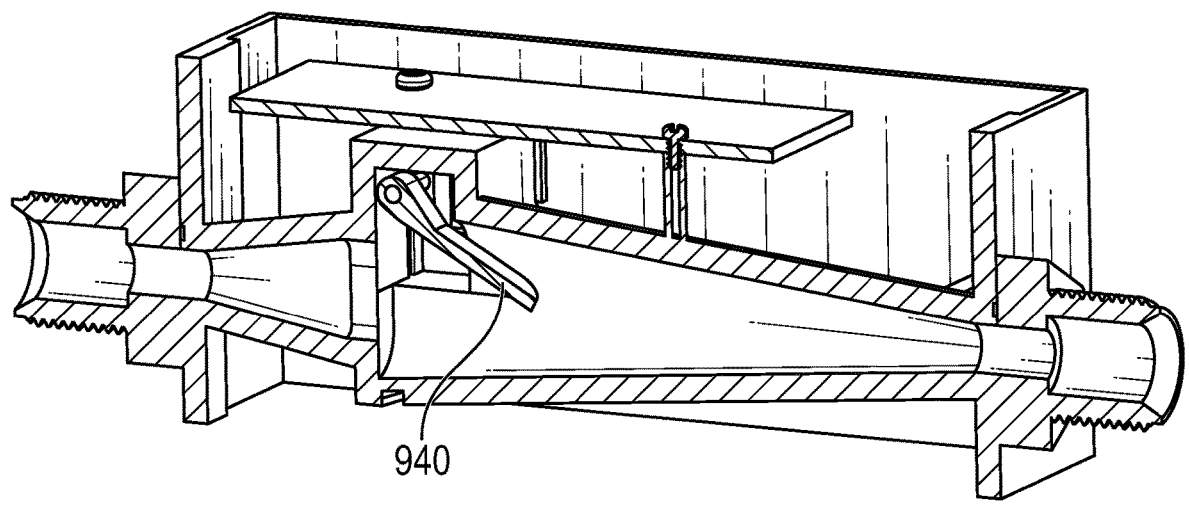

Referring to FIG. 28, a flap 940 is in an open position.

The disclosed embodiments include onboard electronics/firmware the receive, motions from internal parts such as the pinwheel or other motion sensor, the embodiments record, store and transmit the signals and data to an external receiver by any means including Bluetooth and or WiFi. The data receiver may take the form of a smartphone with an app, desktop computer or other similar device with the appropriate app or program.

The disclosed embodiments include other means of measuring water flow that may include solid diaphragm, iris diaphragm, or solenoid-controlled barrier.

What is claimed is:

1. A single channel fluid leak measurement system, the system comprising:
   a) an upper body and a lower body;
   b) the single channel defined by internal walls of the upper and lower body;
   c) a printed circuit board assembly attached to the upper body;
   d) the printed circuit board in communication with a flap, the flap rotationally disposed within the single channel; wherein the flap is configured to be in a closed position, wherein the flap is configured to rotate to an open position in response to flow of fluid, and wherein the flap is configured to reset automatically to the closed position in absence of flow of fluid;
   e) a magnet configured to releasably hold the flap in the closed position; and
   f) wherein the printed circuit board assembly comprises a magnetic rotational sensor and the flap is attached to a magnetic shaft with the magnetic shaft in communication with the magnetic rotational sensor.

2. The system of claim 1, wherein the printed circuit board reports movement of the flap.

3. The system of claim 1, wherein the flap is replaced by a solid diaphragm, iris diaphragm, or solenoid-controlled barrier.

4. A single channel fluid leak measurement system, the system comprising:
   a) an upper body and a lower body;
   b) the single channel defined by internal walls of the upper and lower body;
   c) a printed circuit board assembly attached to the upper body;
   d) the printed circuit board in communication with a flap, the flap rotationally disposed within the single channel; wherein the flap is configured to be in a closed position, wherein the flap is configured to rotate to an open position in response to flow of fluid, and wherein the flap is configured to reset automatically to the closed position in absence of flow of fluid;
   e) a magnet configured to releasably hold the flap in the closed position; and
   f) further including electronics and firmware to receive motions of the magnetic shaft, to record, store and transmit signals and data to an external receiver by any means including Bluetooth and or WiFi, the data receiver may take the form of a smartphone with an app, desktop computer or other similar device.

* * * * *